United States Patent
Jang et al.

(10) Patent No.: US 9,794,613 B2
(45) Date of Patent: *Oct. 17, 2017

(54) ELECTRONIC DEVICE AND METHOD FOR CONTROLLING THE SAME

(75) Inventors: Seokbok Jang, Seoul (KR); Jongse Park, Seoul (KR); Joonyup Lee, Seoul (KR); Jungkyu Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 924 days.

This patent is subject to a terminal disclaimer.

(21) Appl. No.: 13/272,352

(22) Filed: Oct. 13, 2011

(65) Prior Publication Data

US 2013/0024197 A1    Jan. 24, 2013

Related U.S. Application Data

(63) Continuation of application No. PCT/KR2011/005298, filed on Jul. 19, 2011.

(30) Foreign Application Priority Data

Jul. 19, 2011    (WO) ................ PCT/KR2011/005298

(51) Int. Cl.
*G10L 15/00* (2013.01)
*H04N 21/422* (2011.01)
(Continued)

(52) U.S. Cl.
CPC ....... *H04N 21/42203* (2013.01); *G06F 3/167* (2013.01); *G10L 15/18* (2013.01);
(Continued)

(58) Field of Classification Search
USPC ............... 704/2, 270, 246, 275, 235, 9, 257; 386/83, 230, 297; 725/135, 45, 133, 61,
(Continued)

(56) References Cited

U.S. PATENT DOCUMENTS 5,335,313 A * 8/1994 Douglas ................ A61G 7/018
379/355.01
5,774,859 A * 6/1998 Houser et al. ................ 704/275
(Continued)

FOREIGN PATENT DOCUMENTS

| EP | 1033701 | 9/2000 |
|---|---|---|
| KR | 10-2008-0029238 A | 4/2008 |
| KR | 10-2011-0052863 A | 5/2011 |

OTHER PUBLICATIONS

PCT International Search Report, dated Mar. 13, 2012 for Application No. PCT/KR2011/005298, with English translation, 10 pages.

*Primary Examiner* — Neeraj Sharma
(74) *Attorney, Agent, or Firm* — Fish & Richardson P.C.

(57) ABSTRACT

An electronic device and a method for controlling an electronic device are disclosed. The electronic device includes: a display unit; a voice input unit; and a controller displaying a plurality of contents on the display unit, receiving a voice command for controlling any one of the plurality of contents through the voice input unit, and controlling content corresponding to the received voice command. Multitasking performed by the electronic device can be effectively controlled through a voice command.

14 Claims, 20 Drawing Sheets

(51) Int. Cl.
*G10L 15/22* (2006.01)
*G06F 3/16* (2006.01)
*G10L 15/18* (2013.01)
*H04N 21/434* (2011.01)
*H04N 21/439* (2011.01)
*H04N 21/4782* (2011.01)
*H04N 21/482* (2011.01)
*H04N 21/61* (2011.01)
*H04N 21/8405* (2011.01)
*G10L 21/00* (2013.01)
*H04N 5/00* (2011.01)
*H04N 7/00* (2011.01)
*G06F 13/00* (2006.01)
*G10K 11/00* (2006.01)
*G06F 17/00* (2006.01)
*G09G 5/00* (2006.01)
*G06F 3/00* (2006.01)
*H04M 3/00* (2006.01)
*H04B 1/00* (2006.01)
*G06F 15/00* (2006.01)
*H04R 3/00* (2006.01)
*G10L 15/08* (2006.01)

(52) U.S. Cl.
CPC ......... *G10L 15/22* (2013.01); *H04N 21/4345* (2013.01); *H04N 21/4394* (2013.01); *H04N 21/4782* (2013.01); *H04N 21/4821* (2013.01); *H04N 21/4828* (2013.01); *H04N 21/6125* (2013.01); *H04N 21/8405* (2013.01); *G10L 2015/088* (2013.01); *G10L 2015/223* (2013.01); *G10L 2015/228* (2013.01)

(58) Field of Classification Search
USPC .......... 725/39; 367/198; 700/94; 455/414.1, 455/567; 348/164, 732; 381/92; 345/581, 545; 707/759, 706; 715/765; 709/203
See application file for complete search history.

(56) References Cited

U.S. PATENT DOCUMENTS

| | | | | |
|---|---|---|---|---|
| 6,185,535 B1* | 2/2001 | Hedin | ........... | G10L 15/30 704/270 |
| 6,606,280 B1* | 8/2003 | Knittel | ........... | 367/198 |
| 6,718,308 B1* | 4/2004 | Nolting | ........... | G10L 15/26 704/275 |
| 7,499,859 B2* | 3/2009 | Lu et al. | ........... | 704/270 |
| 8,620,667 B2* | 12/2013 | Andrew | ........... | G10L 15/19 704/231 |
| 8,676,273 B1* | 3/2014 | Fujisaki | ........... | H04M 1/6505 379/142.06 |
| 2001/0053944 A1* | 12/2001 | Marks et al. | ........... | 700/94 |
| 2005/0132420 A1* | 6/2005 | Howard et al. | ........... | 725/135 |
| 2006/0041926 A1* | 2/2006 | Istvan et al. | ........... | 725/133 |
| 2007/0201824 A1* | 8/2007 | Masaki et al. | ........... | 386/83 |
| 2008/0082342 A1 | 4/2008 | Kim et al. | | |
| 2008/0103780 A1 | 5/2008 | Dacosta | | |
| 2010/0076763 A1* | 3/2010 | Ouchi | ........... | G06F 13/25 704/246 |
| 2010/0083338 A1 | 4/2010 | Chiang | | |
| 2010/0105364 A1* | 4/2010 | Yang | ........... | 455/414.1 |
| 2010/0312547 A1* | 12/2010 | Van Os | ........... | G06F 3/167 704/9 |
| 2011/0119715 A1 | 5/2011 | Chang et al. | | |
| 2011/0270609 A1* | 11/2011 | Jones et al. | ........... | 704/235 |
| 2011/0313775 A1* | 12/2011 | Laligand et al. | ........... | 704/275 |
| 2012/0019732 A1* | 1/2012 | Lee | ........... | G06F 17/30274 348/732 |
| 2012/0030710 A1* | 2/2012 | Nguyen | ........... | 725/45 |
| 2012/0116748 A1* | 5/2012 | Kore et al. | ........... | 704/2 |
| 2012/0134507 A1* | 5/2012 | Dimitriadis | ........... | H04R 3/00 381/92 |
| 2012/0173238 A1* | 7/2012 | Mickelsen | ........... | G10L 15/30 704/246 |
| 2012/0281097 A1* | 11/2012 | Wood | ........... | H04N 5/2256 348/164 |
| 2013/0073534 A1* | 3/2013 | French | ........... | G06F 17/30746 707/706 |

\* cited by examiner

FIG. 6
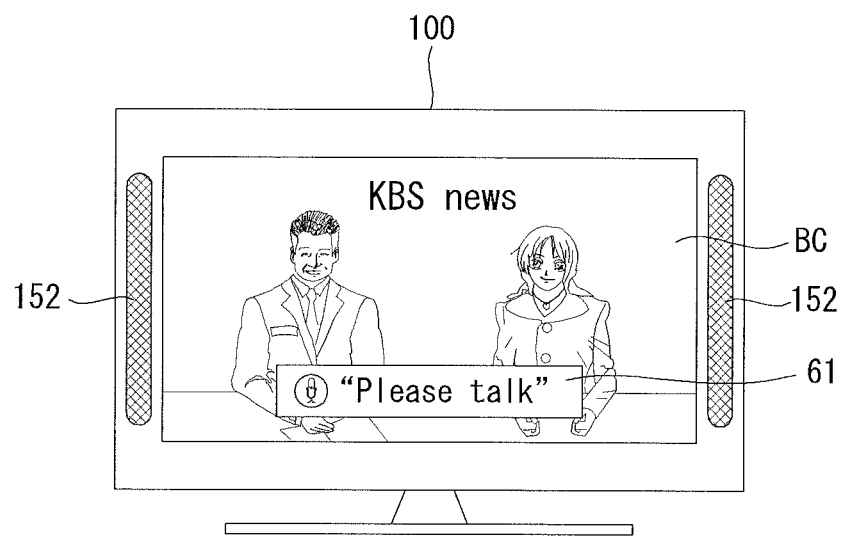
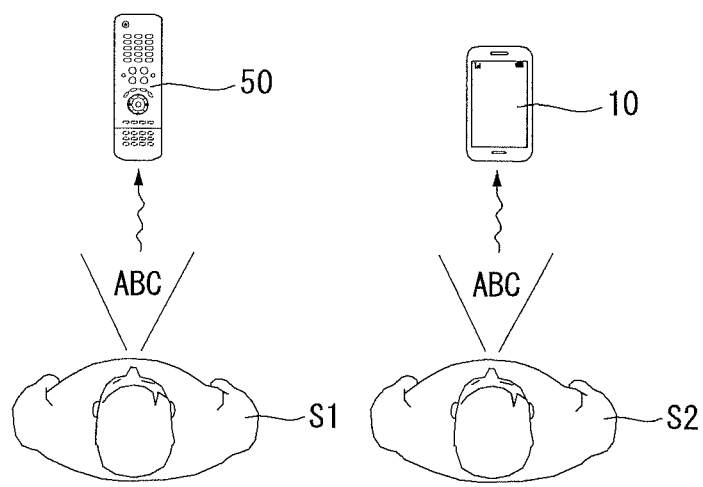

FIG. 9
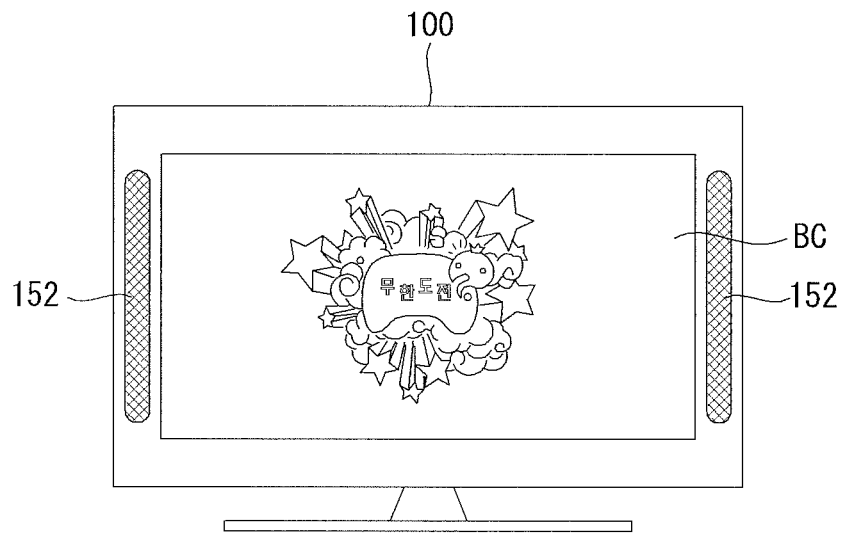
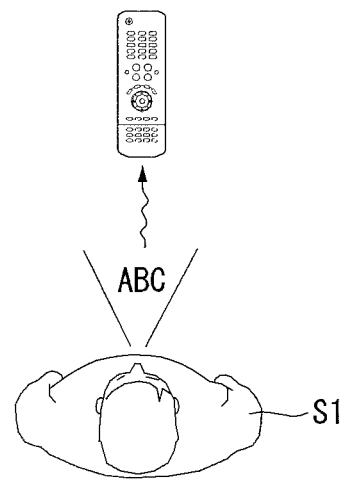

ELECTRONIC DEVICE AND METHOD FOR CONTROLLING THE SAME

The present application claims priority to PCT Application No. PCT/KR2011/005298 filed on Jul. 19, 2011, the entire contents of which are hereby incorporated by reference in their entirety.

BACKGROUND

1. Field

The present invention relates to an electronic device and a control method thereof.

2. Related Art

Currently, DTV, IPTV, smart TV services provide services including a VOD, allowing a user to click buttons of a remote controller. Compared with a computer having a user interface through a keyboard and a mouse, no other user interface than a remote controller has been presented so far for the DTV, IPTV, smart TV, and the like. This is because limited forms of services have been provided and only service forms dependent upon a remote controller have been provided.

Meanwhile, in a smart TV environment, users will view a personalized on-demand type streaming broadcast rather than conventional broadcasts by channel. It is anticipated that service forms are changed into unlimited contents providing formats provided in a content library using a search engine, a recommendation engine, or the like.

Thus, when various services fitting the smart TV environment are provided, the limitation of a remote controller as a means for an interaction with users will be exposed, and development of an interface which replaces a remote controller and fits a new service providing environment is required.

SUMMARY

Accordingly, one object of the present invention is to address the above-noted and other drawbacks of the related art.

Another object of the present invention is to provide an electronic device capable of effectively and conveniently providing various services in a smart TV environment by using information related to various services provided in the smart TV environment by a voice command, and a method for controlling an electronic device.

To accomplish the objects of the present invention, according to an aspect of the present invention, there is provided an electronic system including: a display unit; a voice input unit; and a controller configured to: control display, on the display unit, of multiple, different types of content provided by multiple, different content sources, receive, from the voice input unit, a voice command, select, from among the multiple, different types of content provided by the multiple, different content sources, a first type of content to associate with the received voice command, the first type of content being provided by a first content source, and control output of the first type of content provided by the first content source based on the received voice command.

The electronic system further comprises: multiple command databases that each correspond to one of the multiple, different types of content and store, for the corresponding type of content, control commands used in interpreting voice commands for the corresponding type of content, wherein the controller is configured to: match the received voice command to a first of the multiple command databases that corresponds to the first type of content; select, from among the multiple, different types of content provided by the multiple, different content sources, the first type of content to associate with the received voice command based on matching the received voice command to the first of the multiple command databases; recognize the received voice command based on the first of the multiple command databases; and control output of the first type of content provided by the first content source based on recognition of the received voice command and the first of the multiple command databases.

The electronic system further comprises: a common command database that corresponds to more than one of the multiple, different types of content and stores control commands used in interpreting voice commands that are applicable to more than one of the multiple, different types of content, wherein the controller is configured to: match the received voice command to the common command database; determine that the first type of content is being displayed on the display unit at a time of the received voice command; select, from among the multiple, different types of content provided by the multiple, different content sources, the first type of content to associate with the received voice command based on the determination that the first type of content is being displayed on the display unit at the time of the received voice command; recognize the received voice command based on the common command database; and control output of the first type of content provided by the first content source based on recognition of the received voice command and the common command database.

Wherein the controller is configured to recognize that the received voice command is a command commonly applied to the multiple, different types of content, and, based on the recognition that the received voice command is a command commonly applied to the multiple, different types of content, select the first type of content to associate with the received voice command according to a predetermined reference.

Wherein the controller is configured to control display of a user interface that allows a user to select, from among the multiple, different types of content provided by the multiple, different content sources, a type of content to be controlled according to the received voice command and select the first type of content to associate with the received voice command based on user input from the user interface selecting the first type of content as the type of content to be controlled.

Wherein the controller is configured to access an execution order assigned to the multiple, different types of content and select, from among the multiple, different types of content provided by the multiple, different content sources, the first type of content to associate with the received voice command based on the accessed execution order.

Wherein the controller is configured to determine a disposition of content displayed on the display unit and select, from among the multiple, different types of content provided by the multiple, different content sources, the first type of content to associate with the received voice command based on the determined disposition of content displayed on the display unit.

The electronic system further comprises: a camera configured to capture an image of a speaker, wherein the controller is configured to determine a type of content aimed by the speaker based on the captured image of the speaker and select the first type of content to associate with the received voice command based on the determined type of content aimed by the speaker being the first type of content.

wherein the controller is configured to recognize a speaker providing the received voice command based on the received voice command, access speaker information associated with the recognized speaker, and select, from among the multiple, different types of content provided by the multiple, different content sources, the first type of content to associate with the received voice command based on the speaker information.

Wherein the speaker information comprises information regarding the recognized speaker and content the recognized speaker has authority to control, and the controller is configured to select the first type of content to associate with the received voice command based on the information regarding the recognized speaker and the content the recognized speaker has authority to control.

Wherein the controller is configured to extract source information from the received voice command and select, from among the multiple, different types of content provided by the multiple, different content sources, the first type of content to associate with the received voice command based on the first type of content matching the extracted source information.

Wherein the multiple, different types of content have different linguistic characteristics, and the controller is configured to determine linguistic characteristics of the received voice command, compare the determined linguistic characteristics of the received voice command with linguistic characteristics of the multiple, different types of content, and select, from among the multiple, different types of content provided by the multiple, different content sources, the first type of content to associate with the received voice command based on the comparison.

Wherein the multiple, different types of content comprise at least two of a broadcast program, a text document, an image, video, and an application executable on an electronic device.

Wherein the multiple, different types of content comprise a broadcast program and an application executable on the electronic device.

Wherein the multiple, different types of content comprise a broadcast program and a text document retrieved over the Internet.

Wherein the multiple, different types of content comprise a text document retrieved over the Internet and video streamed over the Internet.

Wherein the multiple, different types of content comprise a broadcast program and video streamed over the Internet. wherein the multiple, different types of content comprise a broadcast program, a text document, an image, video, and an application executable on an electronic device.

To accomplish the objects of the present invention, according to another aspect of the present invention, there is provided an electronic device comprising: a controller; and a non-transitory computer-readable storage medium having stored thereon instructions which, when executed by the controller, causes the controller to: control display, on a display unit, of multiple, different types of content provided by multiple, different content sources, receive, from a voice input unit, a voice command, select, from among the multiple, different types of content provided by the multiple, different content sources, a first type of content to associate with the received voice command, the first type of content being provided by a first content source, and control output of the first type of content provided by the first content source based on the received voice command.

To accomplish the objects of the present invention, according to another aspect of the present invention, there is provided a method comprising: controlling display, on a display unit, of multiple, different types of content provided by multiple, different content sources; receiving, from a voice input unit, a voice command; selecting, from among the multiple, different types of content provided by the multiple, different content sources, a first type of content to associate with the received voice command, the first type of content being provided by a first content source; and controlling, by a controller, output of the first type of content provided by the first content source based on the received voice command.

Details of other embodiments are included in a detailed description and drawings.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a view showing an example of inputting a voice command in a voice recognition mode.

FIGS. 9 to 11 are views for explaining specific embodiments of the method for controlling the electronic device illustrated in FIG. 5.

DETAILED DESCRIPTION OF THE PREFERRED EMBODIMENTS

Reference will now be made in detail to the preferred embodiments of the present invention, examples of which are illustrated in the accompanying drawings.

Objectives, characteristics, and advantages of the present invention described in detail above will be more clearly understood by the following detailed description. In what follows, preferred embodiments of the present invention will be described in detail with reference to appended drawings. Throughout the document, the same reference number refers to the same element. In addition, if it is determined that specific description about a well-known function or structure related to the present invention unnecessarily brings ambiguity to the understanding of the technical principles of the present invention, the corresponding description will be omitted.

In what follows, a display device related to the present invention will be described in more detail with reference to the appended drawings. The suffix of "module" and "unit" associated with a constituting element employed for the description below does not carry a meaning or a role in itself distinguished from the other.

Figure 1:
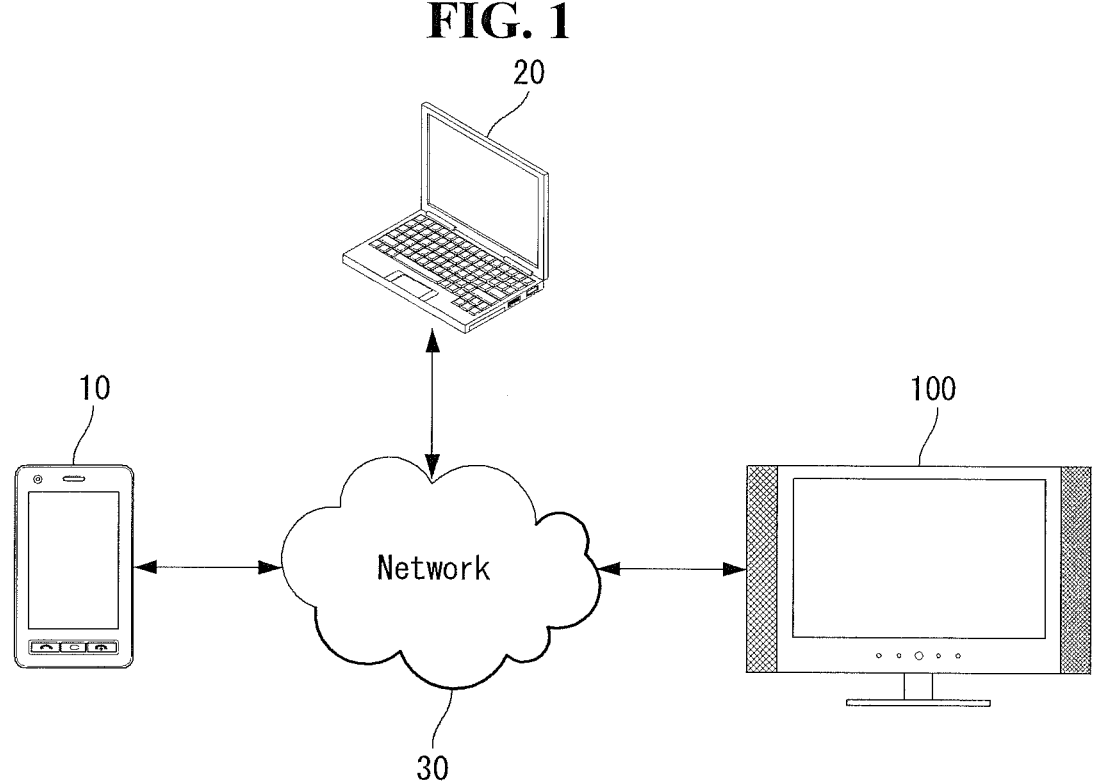
FIG. 1 is a view showing a structure of a service network for sharing content between electronic devices according to an embodiment of the present invention.

FIG. 1 is a diagram illustrating a structure of a service network according to an embodiment of this document and a structure of a service network for sharing content between electronic devices.

Referring to FIG. 1, the electronic device 100 is connected to at least one external electronic device 10,20 that can perform an image display function through a network, and transmits content to the external electronic device 10, in order to display content in the external electronic device 10, 20 or receives content from the external electronic device 10, 20 and displays the content on a screen and thus shares the content with the external electronic device 10, 20.

FIG. 1 illustrates a case where the electronic device 100 is television (TV), and the external electronic device is a mobile phone 10, a laptop computer 20, but this document is not limited thereto. According to an embodiment of this document, the electronic device 100 and the external electronic device 10, 20 may be a mobile phone, a TV, a laptop computer, a smart phone, a digital broadcasting terminal, a PDA, a Portable Multimedia Player (PMP), a navigator, a desktop computer, a set-top box, a Personal Video Recorder (PVR), and an electronic frame.

Referring again to FIG. 1, in order for the electronic device 100 to share content with the external electronic device 10, 20, it is necessary to form a platform of the electronic device 100 and the external electronic device 10, for mutual compatibility between the electronic device 100 and the external electronic device 10, 20. For this reason, the electronic devices 100 and 200 according to an embodiment of this document form a platform based on a Digital Living Network Alliance (DLNA).

According to the DLNA, IPv4 may be used as a network stack, and for network connection, Ethernet, a Wireless Local Network (WLAN) (802.11a/b/g), Wireless Fidelity (Wi-Fi), Bluetooth, and a communication method that may perform IP connection may be used.

According to the DLNA, in order to discover and control an electronic device, Universal Plug and Play (UPnP), particularly, UPnP AV Architecture and UPnP Device Architecture are generally used. For example, in order to discover an electronic device, a Simple Service Discovery Protocol (SSDP) can be used. Further, in order to control an electronic device, a Simple Object Access Protocol (SOAP) can be used.

According to the DLNA, in order to transmit media, HTTP and RTP can be used, and JPEG, LPCM, MPEG2, MP3, and MPEG4 can be used as a media format.

According to the DLNA, Digital Media Server (DMS), Digital Media Player (DMP), Digital Media Renderer (DMR), and Digital Media Controller (DMC) type electronic devices may be supported.

Figure 2:
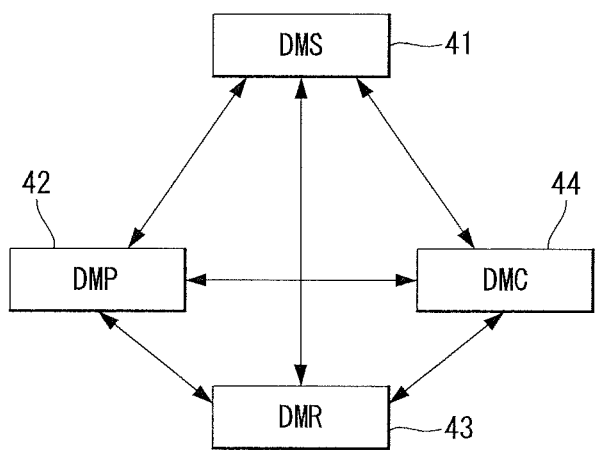
FIG. 2 is a conceptual view of a DLNA network.

FIG. 2 is a conceptual diagram of a DLNA network.

The DLNA is a network and is a typical name of a standardization device for enabling to mutually share content such as music, a moving image, and a still image between electronic devices.

The DLNA generally uses an UPnP protocol.

The DLNA network includes a DMS 41, a DMP 42, a DMR 43, and a DMC 44.

The DLNA network includes at least one of each of the DMS 41, the DMP 42, the DMR 43, and the DMC 44. In this case, the DLNA provides a specification for mutual compatibility of the each device. The DLNA network provides a specification for mutual compatibility between the DMS 41, the DMP 42, the DMR 43, and the DMC 44.

The DMS 41 provides digital media content. In other words, the DMS 41 stores and manages content. The DMS 41 receives and executes various commands from the DMC 44. For example, when the DMS 41 receives a play command, the DMS 41 searches for content to play and provides the content to the DMR 43. The DMS 41 may include, for example, a PC, a PVR, and a set-top box.

The DMP 42 controls content or an electronic device, and controls to content to be played. That is, the DMP 42 performs a function of the DMR 43 for reproduction and a function of the DMC 44 for control. The DMP 42 may include, for example, a TV, a DTV, and a home theater.

The DMR 43 plays content. The DMR 43 plays content that receive from the DMS 41. The DMR 43 may include, for example, an electronic frame.

The DMC 44 provides a control function. The DMC 44 may include, for example, a mobile phone and a PDA.

The DLNA network may include the DMS 41, the DMR 43, and the DMC 44 or may include the DMP 42 and DMR 43.

Further, the DMS 41, the DMP 42, the DMR 43, and the DMC 44 may be a term of functionally classifying an electronic device. For example, when the mobile phone has a reproduction function as well as a control function, the mobile phone may correspond to the DMP 42, and when the DTV manages content, the DTV may correspond to the DMS 41 as well as the DMP 42.

The electronic device 100 shown in FIG. 1 or FIG. 2 or both may correspond to at least one of the DMS, the DMP, the DMC, and the DMR according to its function. Likewise, the external electronic device 10, 20 may also correspond to at least one of the DMS, the DMP, the DMC, and the DMR according to its function. Accordingly, mutual compatibility between electronic devices can be guaranteed.

Figure 3:
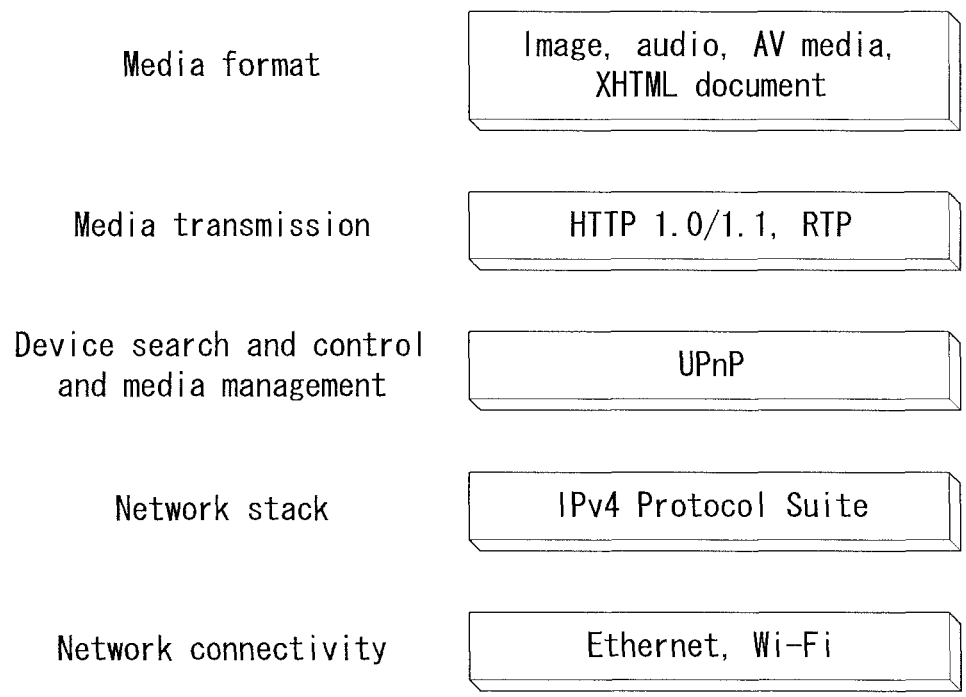
FIG. 3 is a view showing function components according to the DLNA.

FIG. 3 is a diagram illustrating a function component according to the DLNA.

The function components according to the DLNA include a media format layer, a media transmission layer, a device search and control and media management layer, a network stack layer, and a network connectivity layer.

The network connectivity layer includes the physical layer and the link layer of a network. The network connectivity layer includes Ethernet, Wi-Fi, and Bluetooth. Furthermore, the network connectivity layer uses a communication medium which can perform IP connection.

The network stack layer uses an IPv4 protocol.

The device search and control and media management layer chiefly uses UPnP, particularly, UPnP AV Architecture and UPnP Device Architecture. For example, for device search, the SSDP may be used. For control, the SOAP may be used.

The media transmission layer uses HTTP 1.0/1.1 or a real-time transport protocol (RTP) in order to play streaming.

The media format layer uses images, audio, AV media, and Extensible Hypertext Markup Language (XHTML) document.

Figure 4:
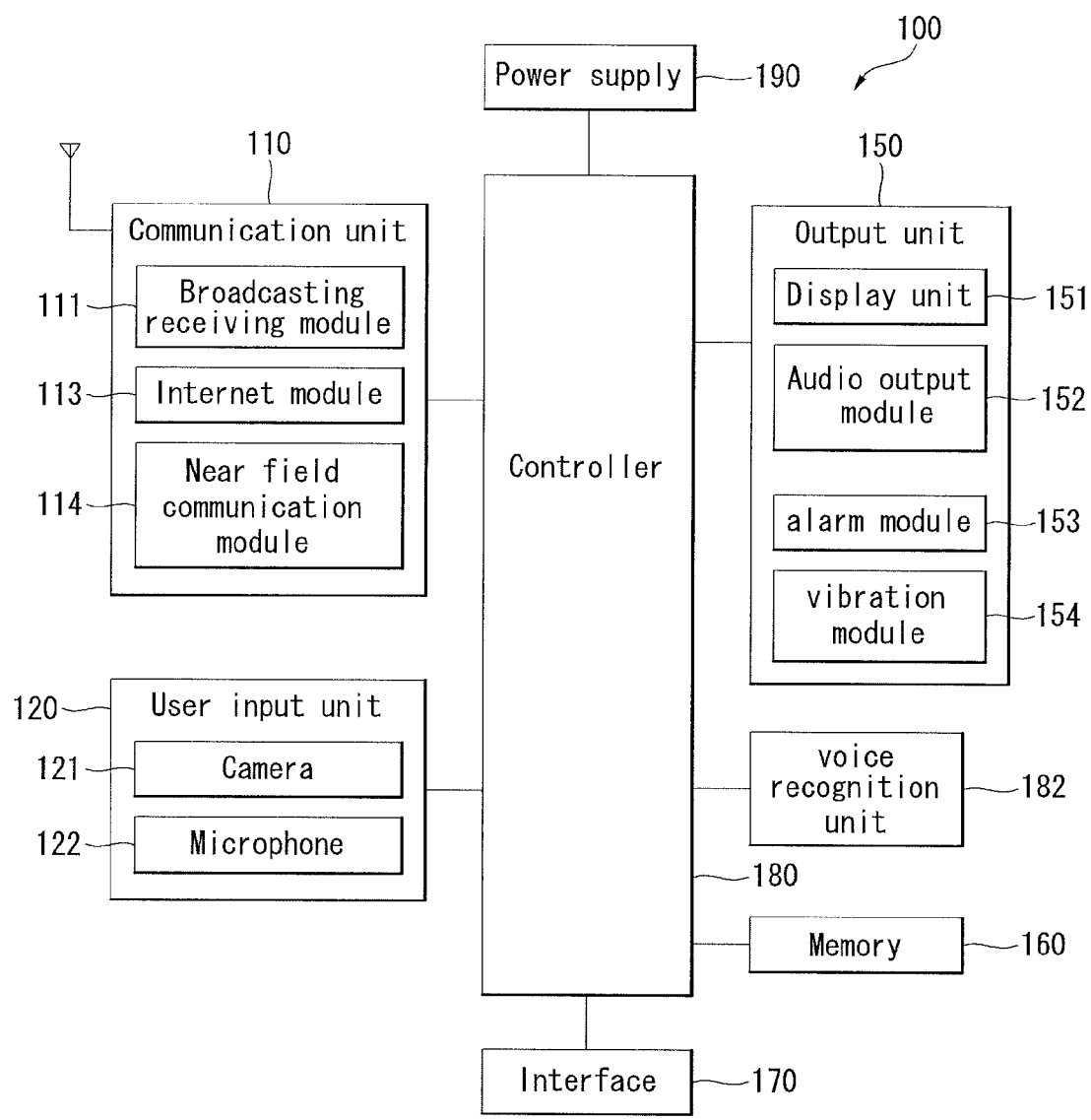
FIG. 4 is an overall schematic block diagram of an electronic device according to an embodiment of the present invention.

FIG. 4 is a block diagram of the electronic device 100 according to an embodiment of the present invention. As shown, the electronic device 100 includes a communication unit 110, an A/V (Audio/Video) input unit 120, an output unit 150, a memory 160, an interface unit 170, a controller 180, and a power supply unit 190, etc. FIG. 4 shows the electronic device as having various components, but implementing all of the illustrated components is not a requirement. Greater or fewer components may alternatively be implemented.

In addition, the communication unit 110 generally includes one or more components allowing radio communication between the electronic device 100 and a communication system or a network in which the electronic device is located. For example, in FIG. 4, the communication unit includes at least one of a broadcast receiving module 111, a wireless Internet module 113, a short-range communication module 114.

The broadcast receiving module 111 receives broadcast signals and/or broadcast associated information from an external broadcast management server via a broadcast channel. Further, the broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast signal may include a TV broadcast signal, a radio broadcast signal, a data broadcast signal, and the like. Also, the broadcast signal may further include a broadcast signal combined with a TV or radio broadcast signal.

In addition, the broadcast associated information may refer to information associated with a broadcast channel, a broadcast program or a broadcast service provider.

Further, the broadcast signal may exist in various forms. For example, the broadcast signal may exist in the form of an electronic program guide (EPG) of the digital multimedia broadcasting (DMB) system, and electronic service guide (ESG) of the digital video broadcast-handheld (DVB-H) system, and the like.

The broadcast receiving module 111 may also be configured to receive signals broadcast by using various types of broadcast systems. In particular, the broadcast receiving module 111 can receive a digital broadcast using a digital broadcast system such as the multimedia broadcasting-terrestrial (DMB-T) system, the digital multimedia broadcasting-satellite (DMB-S) system, the digital video broadcast-handheld (DVB-H) system, the data broadcasting system known as the media forward link only (MediaFLO®), the integrated services digital broadcast-terrestrial (ISDB-T) system, etc.

The broadcast receiving module 111 can also be configured to be suitable for all broadcast systems that provide a broadcast signal as well as the above-mentioned digital broadcast systems. In addition, the broadcast signals and/or broadcast-associated information received via the broadcast receiving module 111 may be stored in the memory 160.

The Internet module 113 supports Internet access for the electronic device and may be internally or externally coupled to the electronic device. The wireless Internet access technique implemented may include a WLAN (Wireless LAN) (Wi-Fi), Wibro (Wireless broadband), Wimax (World Interoperability for Microwave Access), HSDPA (High Speed Downlink Packet Access), or the like.

Further, the short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

With reference to FIG. 4, the A/V input unit 120 is configured to receive an audio or video signal, and includes a camera 121 and a microphone 122. The camera 121 processes image data of still pictures or video obtained by an image capture device in a video capturing mode or an image capturing mode, and the processed image frames can then be displayed on a display unit 151.

Further, the image frames processed by the camera 121 may be stored in the memory 160 or transmitted via the communication unit 110. Two or more cameras 121 may also be provided according to the configuration of the electronic device.

In addition, the microphone 122 can receive sounds via a microphone in a phone call mode, a recording mode, a voice recognition mode, and the like, and can process such sounds into audio data. The microphone 122 may also implement various types of noise canceling (or suppression) algorithms to cancel or suppress noise or interference generated when receiving and transmitting audio signals.

In addition, the output unit 150 is configured to provide outputs in a visual, audible, and/or tactile manner. In the example in FIG. 4, the output unit 150 includes the display unit 151, an audio output module 152, an alarm module 153, a vibration module 154, and the like. In more detail, the display unit 151 displays information processed by the image electronic device 100. For examples, the display unit 151 displays UI or graphic user interface (GUI) related to a displaying image. The display unit 151 displays a captured or/and received image, UI or GUI when the image electronic device 100 is in the video mode or the photographing mode.

The display unit 151 may also include at least one of a Liquid Crystal Display (LCD), a Thin Film Transistor-LCD (TFT-LCD), an Organic Light Emitting Diode (OLED) display, a flexible display, a three-dimensional (3D) display, or the like. Some of these displays may also be configured to be transparent or light-transmissive to allow for viewing of the exterior, which is called transparent displays.

An example transparent display is a TOLED (Transparent Organic Light Emitting Diode) display, or the like. A rear structure of the display unit 151 may be also light-transmissive. Through such configuration, the user can view an object positioned at the rear side of the terminal body through the region occupied by the display unit 151 of the terminal body.

The audio output unit 152 can output audio data received from the communication unit 110 or stored in the memory 160 in a audio signal receiving mode and a broadcasting receiving mode. The audio output unit 152 outputs audio signals related to functions performed in the image electronic device 100. The audio output unit 152 may comprise a receiver, a speaker, a buzzer, etc.

The alarm module 153 generates a signal for informing an event generated from the electronic device 100. The event generated from the electronic device 100 may include a speaker's voice input, a gesture input, a message input, and various control inputs through a remote controller. The alarm module 153 may also generate a signal for informing the generation of an event in other forms (e.g., vibration) other than a video signal or an audio signal. The video signal or the audio signal may also be generated through the display unit 151 or the audio output module 152.

The vibration module 154 can generate particular frequencies inducing a tactile sense due to particular pressure and feedback vibrations having a vibration pattern corresponding to the pattern of a speaker's voice input through a voice input device; and transmit the feedback vibrations to the speaker.

The memory 160 can store a program for describing the operation of the controller 180; the memory 160 can also store input and output data temporarily. The memory 160 can store data about various patterns of vibration and sound corresponding to at least one voice pattern input from at least one speaker.

Furthermore, the memory 160 may include an audio model, a recognition dictionary, a translation database, a predetermined language model, and a command database which are necessary for the operation of the present invention.

The recognition dictionary can include at least one form of a word, a clause, a keyword, and an expression of a particular language.

The translation database can include data matching multiple languages to one another. For example, the translation database can include data matching a first language (Korean) and a second language (English/Japanese/Chinese) to each other. The second language is a terminology introduced to distinguish from the first language and can correspond to multiple languages. For example, the translation database can include data matching "예약하고 싶습니다" in Korean to "I'd like to make a reservation" in English.

The command databases form a set of commands capable of controlling the electronic device 100. The command databases may exist in independent spaces according to content to be controlled. For example, the command databases may include a channel-related command database for controlling a broadcasting program, a map-related to command database for controlling a navigation program, a game-related command database for controlling a game program.

Each of one or more commands included in each of the channel-related command database, the map-related command database, and the game-related command database has a different subject of control.

For example, in "Channel Switch Command" belonging to the channel-related command database, a broadcasting program is the subject of control. In a "Command for Searching for the Path of the Shortest Distance" belonging to the map-related command database, a navigation program is the subject of control.

Kinds of the command databases are not limited to the above example, and they may exist according to the number of pieces of content which may be executed in the electronic device 100.

Meanwhile, the command databases may include a common command database. The common command database is not a set of commands for controlling a function unique to specific content being executed in the electronic device 100, but a set of commands which can be in common applied to a plurality of pieces of content.

For example, assuming that two pieces of content being executed in the electronic device 100 are game content and a broadcasting program, a voice command spoken in order to raise the volume during play of the game content may be the same as a voice command spoken in order to raise the volume while the broadcasting program is executed.

The memory 160 may also include at least one type of storage medium including a flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 may be operated in relation to a web storage device that performs the storage function of the memory 160 over the Internet.

Also, the interface unit 170 serves as an interface with external devices connected with the electronic device 100. For example, the external devices can transmit data to an external device, receive and transmit power to each element of the electronic device 100, or transmit internal data of the electronic device 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The controller 180 usually controls the overall operation of a electronic device. For example, the controller 180 carries out control and processing related to image display, voice output, and the like. The controller 10 can further comprise a voice recognition unit 182 carrying out voice recognition upon the voice of at least one speaker and although not shown, a voice synthesis unit (not shown), a sound source detection unit (not shown), and a range measurement unit (not shown) which measures the distance to a sound source.

The voice recognition unit 182 can carry out voice recognition upon voice signals input through the microphone 122 of the electronic device 100 or the remote control 10 and/or the mobile terminal shown in FIG. 1; the voice recognition unit 182 can then obtain at least one recognition candidate corresponding to the recognized voice. For example, the voice recognition unit 182 can recognize the input voice signals by detecting voice activity from the input voice signals, carrying out sound analysis thereof, and recognizing the analysis result as a recognition unit. And the voice recognition unit 182 can obtain the at least one recognition candidate corresponding to the voice recognition result with reference to the recognition dictionary and the translation database stored in the memory 160.

The voice synthesis unit (not shown) converts text to voice by using a TTS (Text-To-Speech) engine. TTS technology converts character information or symbols into human speech. TTS technology constructs a pronunciation database for each and every phoneme of a language and generates continuous speech by connecting the phonemes. At this time, by adjusting magnitude, length, and tone of the speech, a natural voice is synthesized; to this end, natural language processing technology can be employed. TTS technology can be easily found in the electronics and telecommunication devices such as CTI, PC, PDA, and mobile devices; and consumer electronics devices such as recorders, toys, and game devices. TTS technology is also widely used for factories to improve productivity or for home automation systems to support much comfortable living. Since TTS technology is one of well-known technologies, further description thereof will not be provided.

A power supply unit 190 provides power required for operating each constituting element by receiving external and internal power controlled by the controller 180.

Also, the power supply unit 190 receives external power or internal power and supplies appropriate power required for operating respective elements and components under the control of the controller 180.

Further, various embodiments described herein may be implemented in a computer-readable or its similar medium using, for example, software, hardware, or any combination thereof.

For a hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For a software implementation, the embodiments such as procedures or functions described herein may be implemented by separate software modules. Each software module may perform one or more functions or operations described herein. Software codes can be implemented by a software application written in any suitable programming language. The software codes may be stored in the memory 160 and executed by the controller 180.

Figure 5:
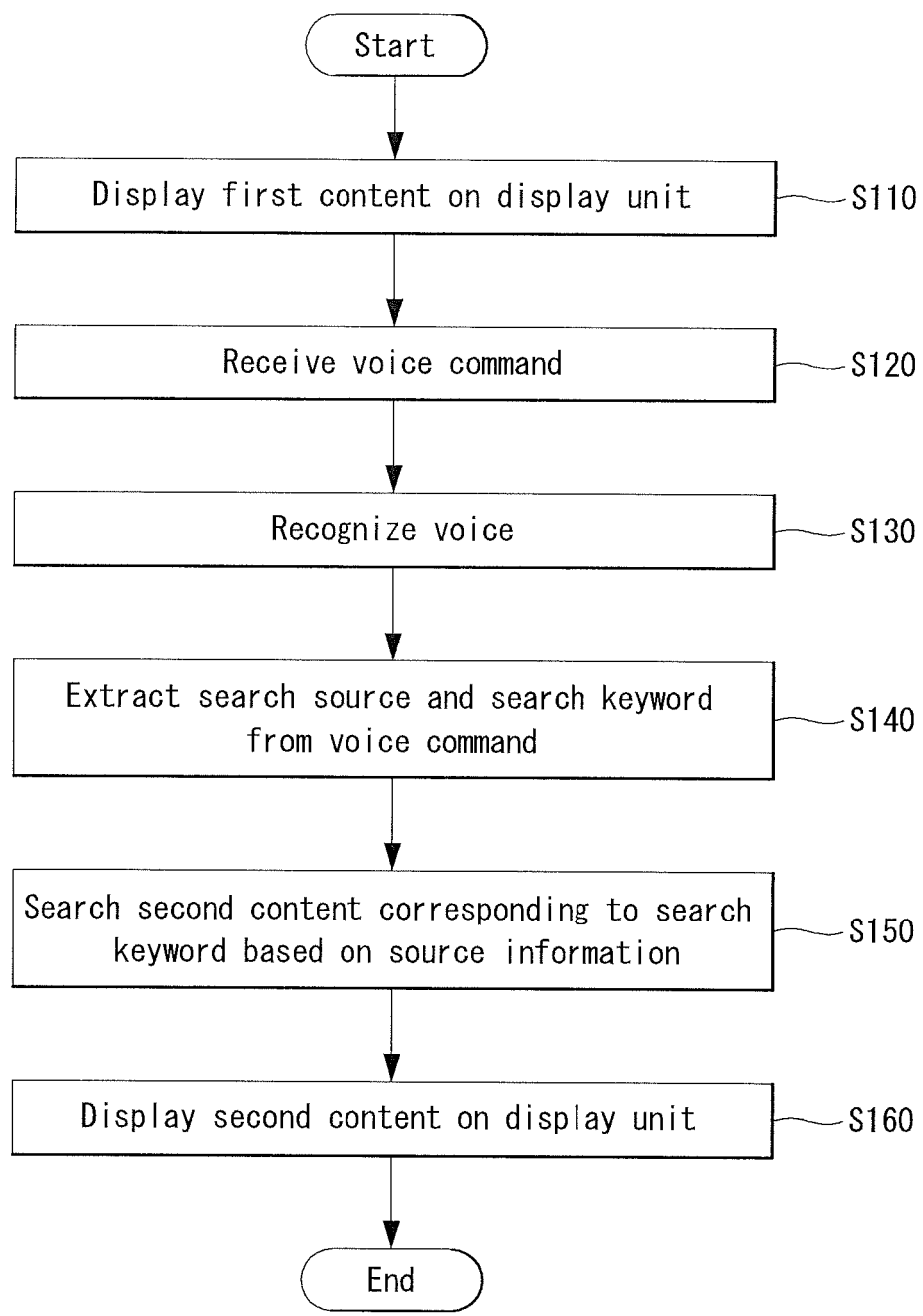
FIG. 5 is a flowchart illustrating a process of a method for controlling an electronic device according to an embodiment of the present invention.

FIG. 5 is a flowchart illustrating a process of a method for controlling an electronic device according to an embodiment of the present invention. FIGS. 6 to 11 are views for explaining the embodiment illustrated in FIG. 5. The control method may be executed under the control of the controller 180.

With reference to FIG. 5, first, the electronic device 100 may display first content on the display unit 151.

The first content may be a broadcast program provided through an EPG. Also, the first content may be Web data provided through a Web. Also, the first content may be multimedia content previously stored in the memory 160 of the electronic device 100 or content provided through at least one of pre-set networks. The network may include the foregoing DLNA network.

While the first content is being provided through the display unit 151, a voice command may be received from the user in operation S120 and the controller 180 may perform voice recognition on the received voice in operation S130.

The controller 180 may extract a search source and a search keyword from the voice command based on the voice recognition results in operation S140.

The search source refers to source information of content provided through the electronic device 100. Namely, the source information may include at least one of an electronic program guide (EPG), a Web, and at least one multimedia content stored in the memory 160 of the electronic device. Also, the source information may include an external device connected with the electronic device 100 through a certain network.

Namely, the user may input a voice command including source information indicating where user desired content belongs along with a search keyword related to the user desired content.

For example, when content desired to be provided by the user is "unlimited challenge", the "unlimited challenge" may be provided through an EPG or various search results may also be provided through a Web. Meanwhile, the content may be a recorded program of "unlimited challenge" which has been previously recorded and stored in the memory 160 by the user. Thus, the voice command input by the user for changing a channel may include source information of the content as well as the search keyword for searching for the content.

The controller 180 may extract a search source and a search keyword through the voice recognition unit 182, and search for second content corresponding to the search keyword based on the extracted source information in operation S150. The controller 18 may search for the search keyword from the source information. For example, when the search keyword is "unlimited challenge" and the source information is "EPG", the controller 180 may search for "unlimited challenge" from the EPG, and when there is a corresponding broadcast program, the controller 180 may provide the same as second content to the user in operation S160.

Hereinafter, specific embodiments related to the method for controlling an electronic device described above with reference to FIG. 5 will be described.

FIG. 6 is a view showing an example of inputting a voice command in a voice recognition mode.

With reference to FIG. 6, in order to receive a user's voice command, the electronic device 100 may enter the voice recognition mode. In the following embodiments, it is assumed that the electronic device 100 is a television.

A broadcast program being currently executed through the electronic device 100 is "news", and users S1 and S2 may execute content other than "news" by changing a channel through a voice command.

The users' voice command may include a remote controller 50 and a mobile terminal 10 which are able to control the operation of the electronic device 100. The remote controller 50 and the mobile terminal 10 may include a microphone for receiving the users' voice, respectively, and may further include a certain wireless communication module for transmitting the input voice signal to the electronic device 100. Also, the users' voice may also be received through the microphone 122 installed in the interior of the electronic device 100.

Also, the remote controller 50 or the mobile terminal 10 may have an additional voice recognition module, and may recognize an input voice command, extract content source information and a search keyword, and transmit the extracted information to the electronic device 100. When the mobile terminal 10 includes a certain voice recognition application, it can realize such a function.

Figure 7:
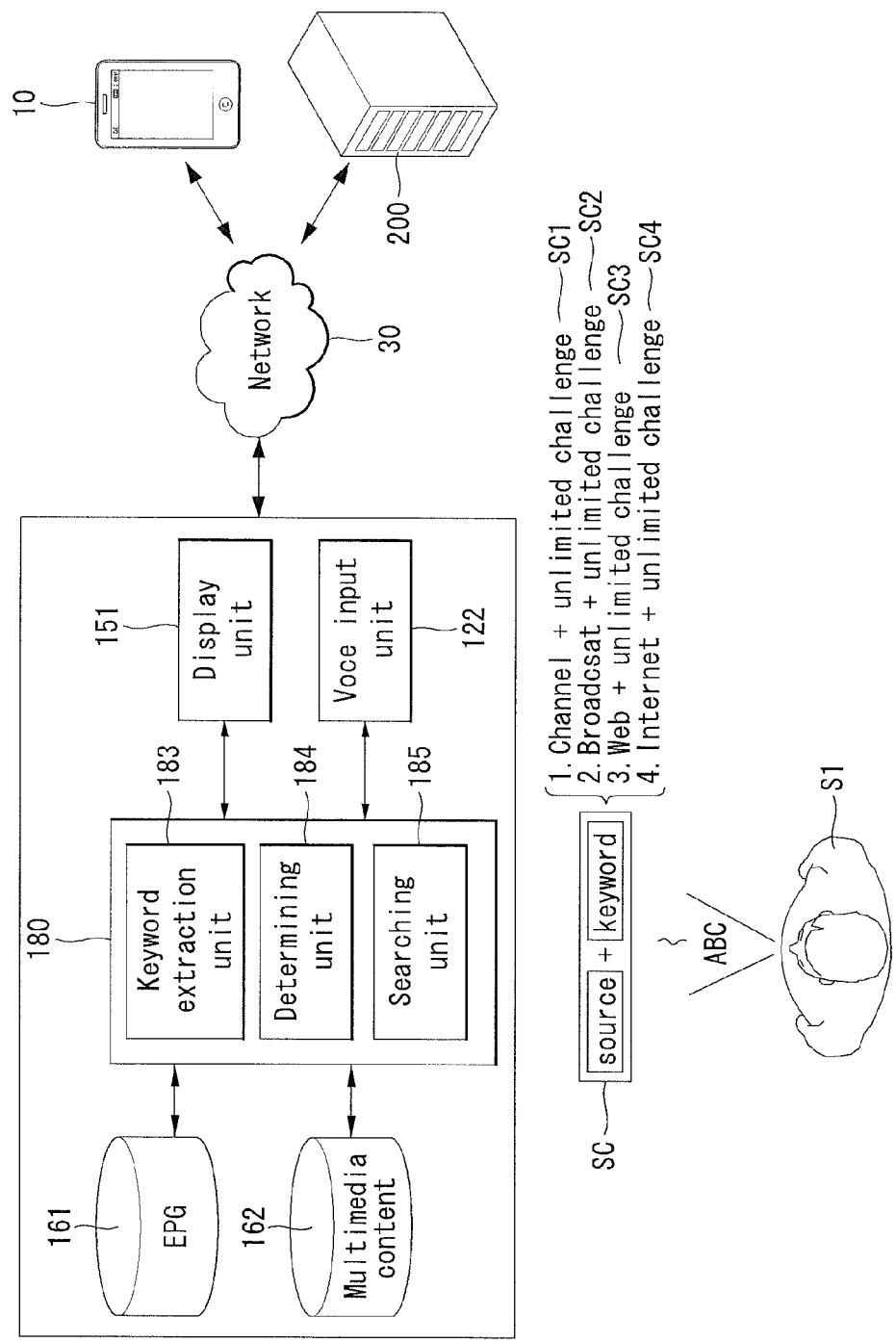
FIG. 7 is a detailed block diagram of an electronic device for performing the method for controlling the electronic device illustrated in FIG. 5.

FIG. 7 is a detailed block diagram of the electronic device for performing the method for controlling the electronic device illustrated in FIG. 5.

With reference to FIG. 7, the electronic device 100 may receive a user's voice through the voice input unit (e.g., the microphone 122). The voice input unit 122 may be a microphone mounted in the interior of the electronic device 100, a microphone array, a mobile terminal, a remote controller, or the like, which exists outside of the electronic device 100 and is in the vicinity of the user.

The voice recognition unit 182 of the electronic device 100 may perform a voice recognition, and extract a keyword included in the user's voice through a keyword extraction unit 183.

The keyword extraction unit 183 may extract at least one keyword from the received user's voice. Namely, the keyword extraction unit 183 may extract a keyword from the user's voice by analyzing the frequency of an electrical voice signal. For example, the keyword extraction unit 183 may extract keywords such as "channel", "unlimited challenge", or the like, from a user's voice command "channel+ unlimited challenge". According to an embodiment of the present invention, preferably, a keyword for content searching is a noun, but the present invention is not limited thereto and information desired to be searched by the user can be extracted from various types of text information through a context awareness process.

The searching unit 183 may search content corresponding to the search keyword from a corresponding source by using "source information" and "search keyword" extracted through the keyword extraction unit 183.

For example, when the user's voice command is "channel", "broadcast', or the like, it may be determined that a source for searching for content is "EPG", and the controller 180 may search second content corresponding to the pertinent search keyword from the EPG. Also, when the user's voice command is "Web", "Internet", or the like, it may be determined that a source for searching for content is "Web" and the controller 180 may access the Internet to search for the second content corresponding to the pertinent search keyword.

Meanwhile, when the user's voice command is an external device connected to the electronic device 100 such as "mobile phone", "notebook computer", or the like, the controller 180 may control the wireless communication module or the short-range communication module to perform data communication with the external device, and search second content corresponding to the pertinent search keyword from the external device or may be connected to a different external device through the external device to obtain the second content.

Meanwhile, when the user's voice command does not include "source information", the controller 180 may search for the second content corresponding to the search keyword from the multimedia content 162 stored in the internal memory 160 of the electronic device 100.

Meanwhile, the determining unit 184 may determine a source of the first content being currently executed through the electronic device 100 and compare the determined source of the first content with source information of the second content requested by the user. For example, when the sources of the first and second contents are the same, the controller 180 may control to search for the second content within the same source. Also, when the sources of the first and second contents are not the same, the controller 180 may control to search for the second content from the source of the second content.

Also, the determining unit 184 may determine whether or not the second content requested by the user is content being currently broadcast. Accordingly, the determining unit 184 may change a channel to a channel through which the second content is broadcast according to a user request.

Also, when the second content is not broadcast through any of channels, the determining unit 184 may search for the second content through the memory 160 of the electronic device 100, a Web server, an external device connected through a network.

Figure 8:
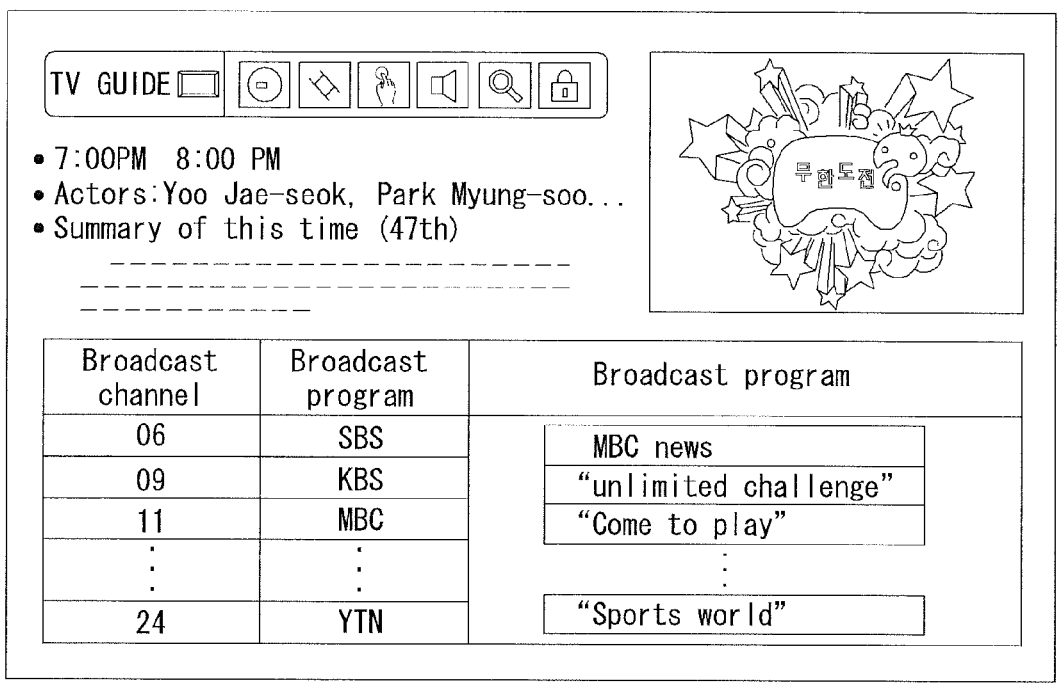
FIG. 8 is a view showing an example of searching for content through an electronic program guide (EPG) when source information is EPG.

FIG. 8 is a view showing an example of searching for content through an electronic program guide (EPG) when source information is EPG.

With reference to FIG. 8, the EPG includes various types of information regarding broadcasts, and the EPG information may be stored in a storage unit (161 in FIG. 7) of the EPG such that it is discriminated from other information.

As shown in FIG. 8, it includes information regarding broadcast channels, broadcasters, and information regarding broadcast programs. For example, when broadcaster information (MBC) is selected, broadcast programs such as "news", "unlimited challenge", "Come to play", "Sports world", or the like, provided by the broadcaster (MBC) may be sorted and displayed in time order. When a voice command "channel+MBC" is input, the controller 180 determines source information as "channel", i.e., EPG, and provide a list of various broadcast programs provided by the MBC.

Also when "channel+broadcaster+broadcast program name" is input, the controller may directly select a broadcast program provided by the corresponding broadcaster from the EPG and provide the same to the user. Meanwhile, the controller 180 may provide broadcast detail information such as a broadcast time, an actor, an introduction of an outline, or the like, with respect to a corresponding broadcast program.

FIGS. 9 to 12 are views for explaining detailed embodiments of the method for controlling an electronic device illustrated in FIG. 5.

With reference to FIG. 9, when a voice command input by the user is "channel+unlimited challenge" or "broadcast+ unlimited challenge", the controller 180 may search for "unlimited challenge" by using the EPG as a source, and display searched content (BC) to the display unit 151.

Figure 10:
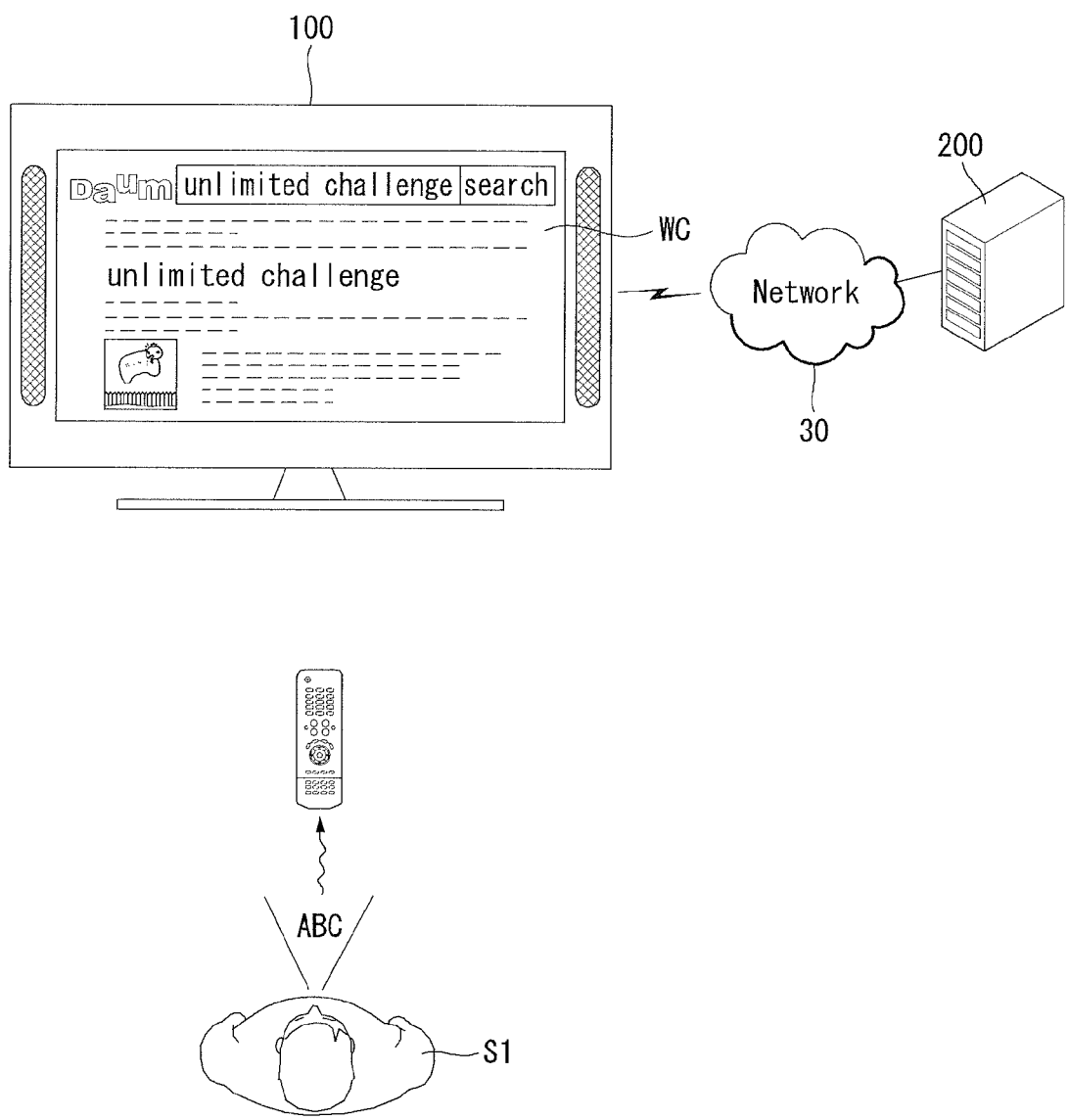

Meanwhile, with reference to FIG. 10, when a voice command input by the user is "Web+unlimited challenge" or "Internet+unlimited challenge", the controller 180 may access a Web server 200 through a certain network 30, search for "unlimited challenge" by using the Internet as a source, and provide searched content to the display unit 151. In this case, the searched content may be a Web page screen image (WC) corresponding to the search keyword, and when a voice command is performed on the Web page screen image, a function corresponding to the voice command may be executed.

Figure 11:
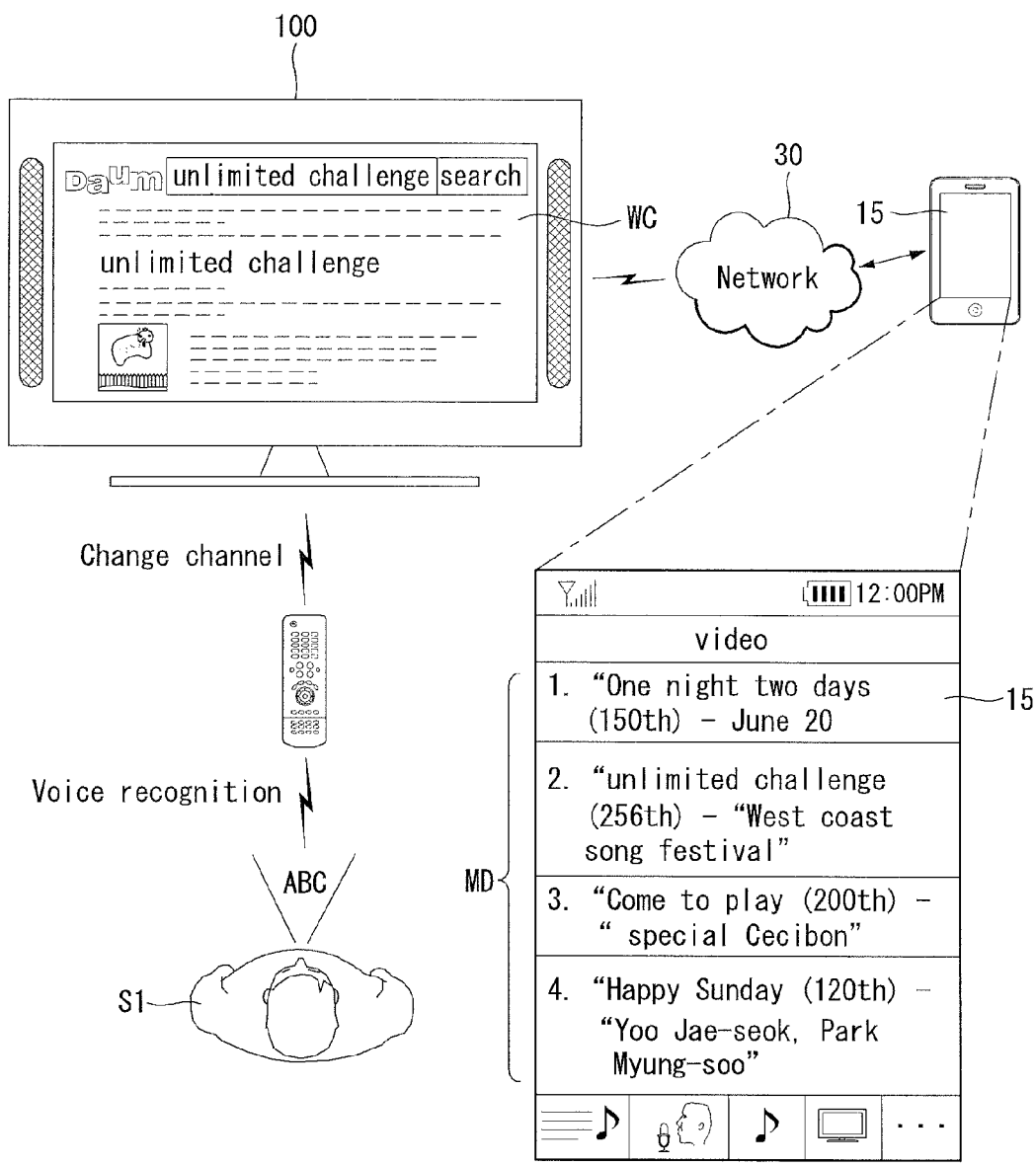

Meanwhile, with reference to FIG. 11, when source information extracted through a voice command input by the user is an external device connected through a certain network, the controller 180 may access the external device 15 through the network 30 and generate a control signal for searching for certain content. For example, when a user's voice command is "mobile terminal+unlimited challenge", the controller 180 may access a mobile terminal 15 connected through the network 30, search for content related to "unlimited challenge" among broadcast programs or multimedia content stored in the mobile terminal 15, and receive the searched content through the network 30.

The embodiments in which when the user wants to change a channel through a certain voice command and the format of the voice command includes source information and a search keyword, the content corresponding to the pertinent keyword may be searched from the corresponding source and provided to the user have been described.

Hereinafter, embodiments in which a process of searching for content desired by the user and providing it when the format of the voice command does not include channel information will be described with reference to FIGS. 12 to 127.

Figure 12:
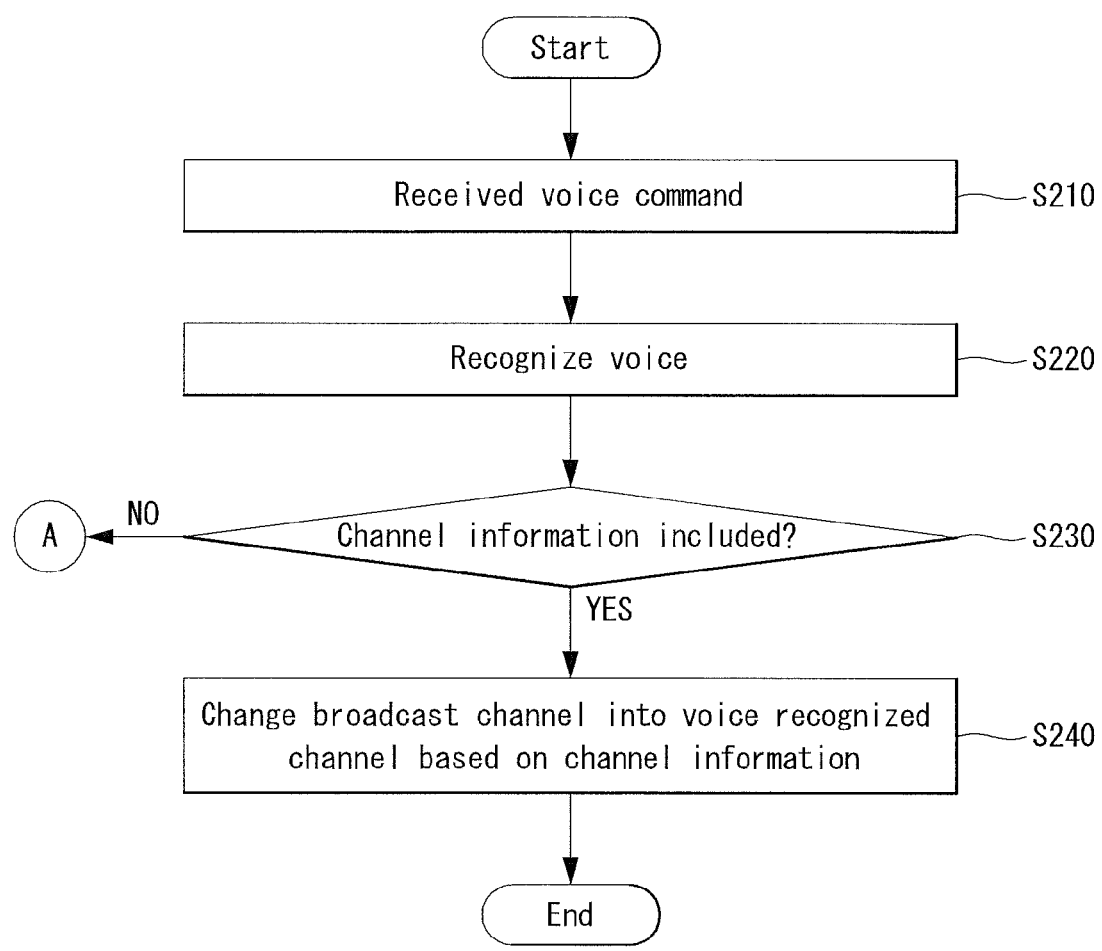
FIGS. 12 to 13 are flowcharts illustrating a process of a method for controlling an electronic device, respectively, according to an embodiment of the present invention.
Figure 13:
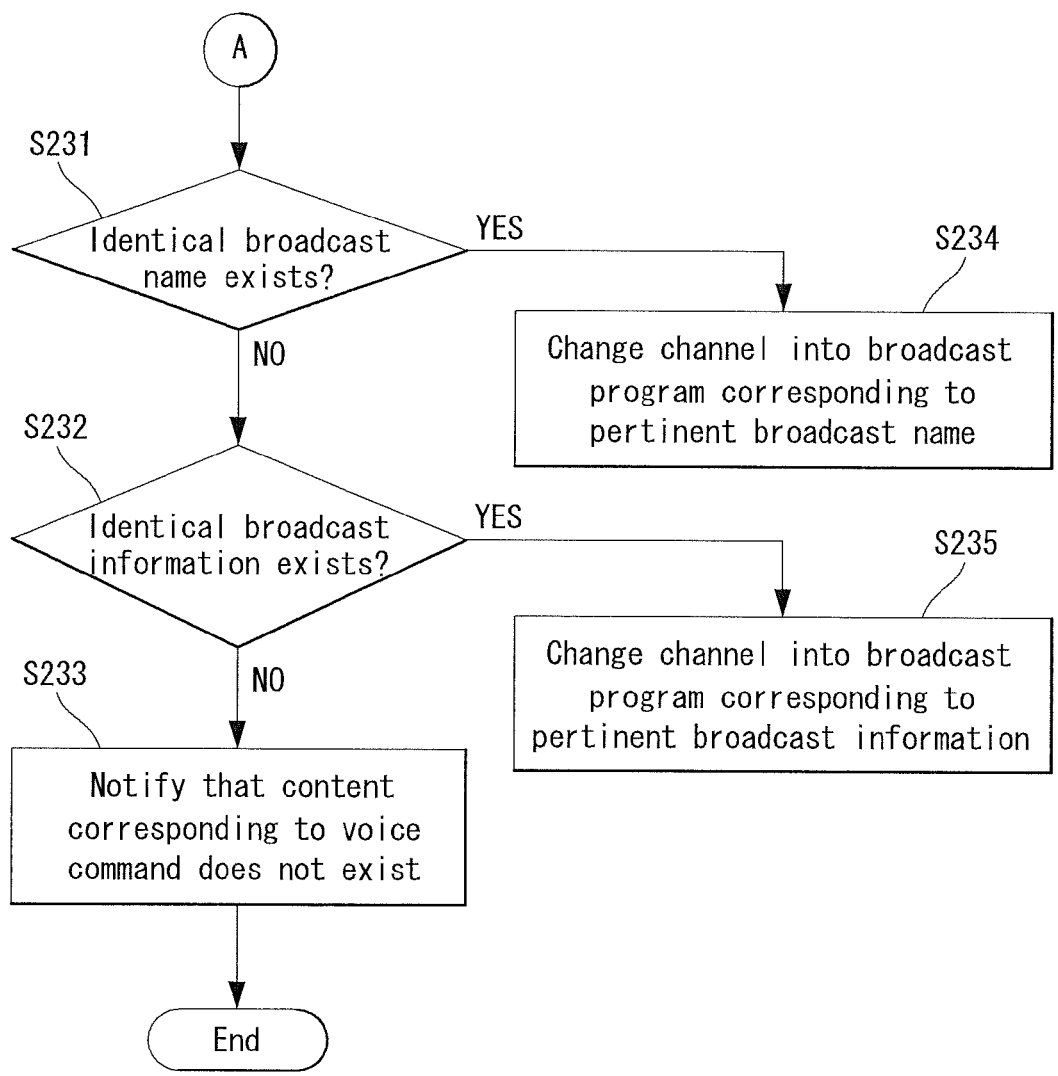
Figure 14:
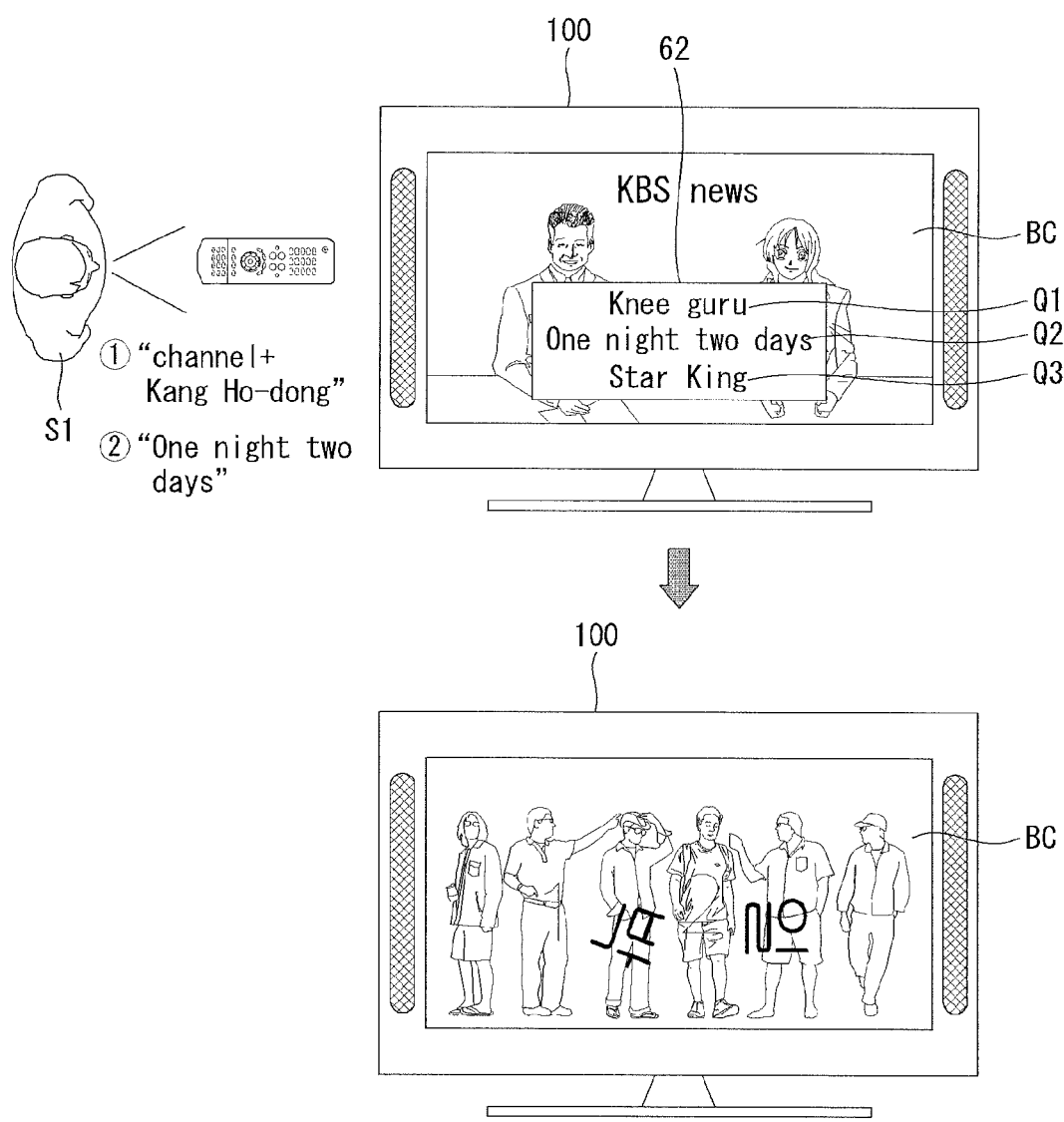
FIGS. 14 to 16 are views for explaining the embodiments illustrated in FIGS. 12 and 13 in detail.
Figure 15:
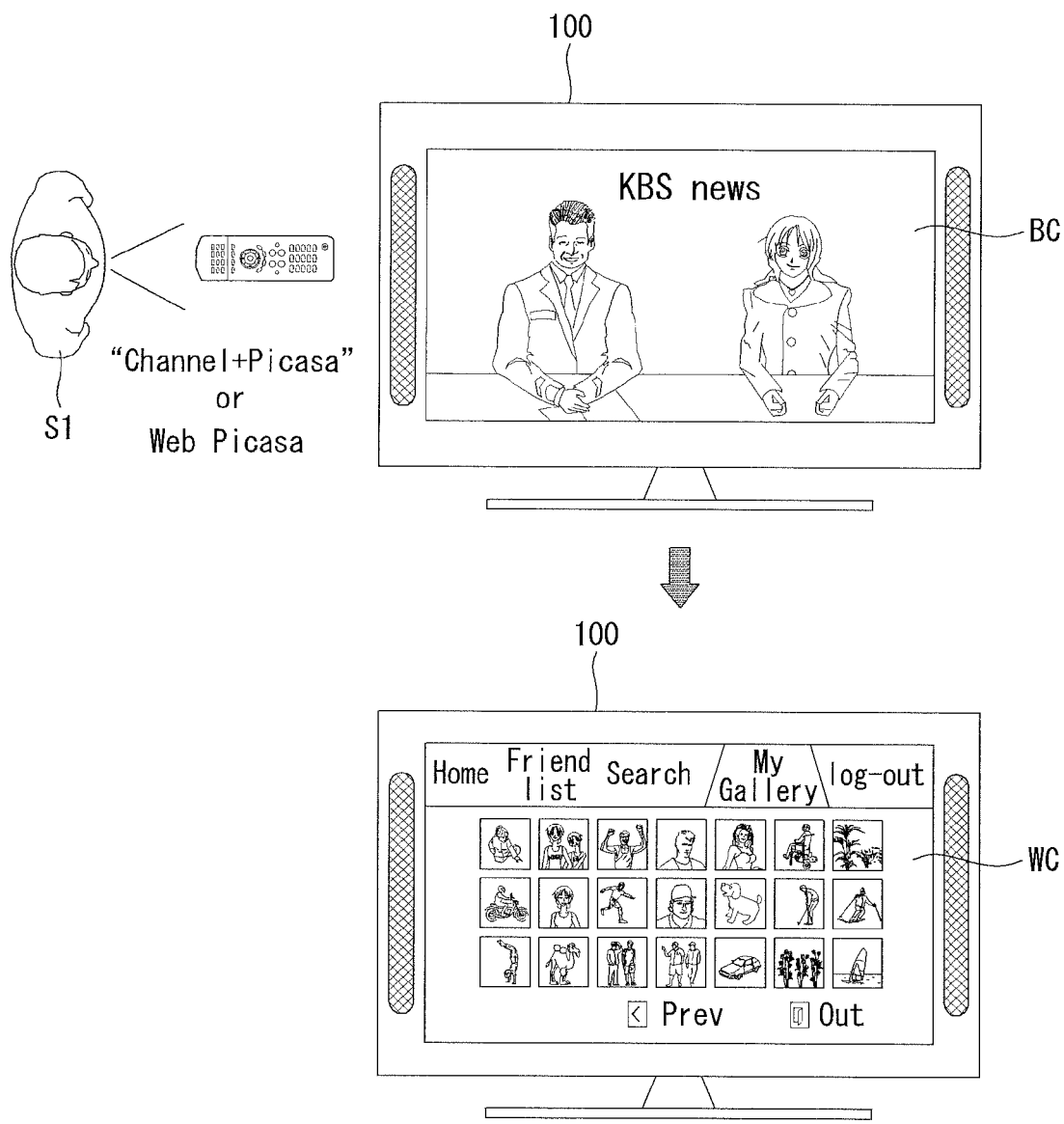
Figure 16:
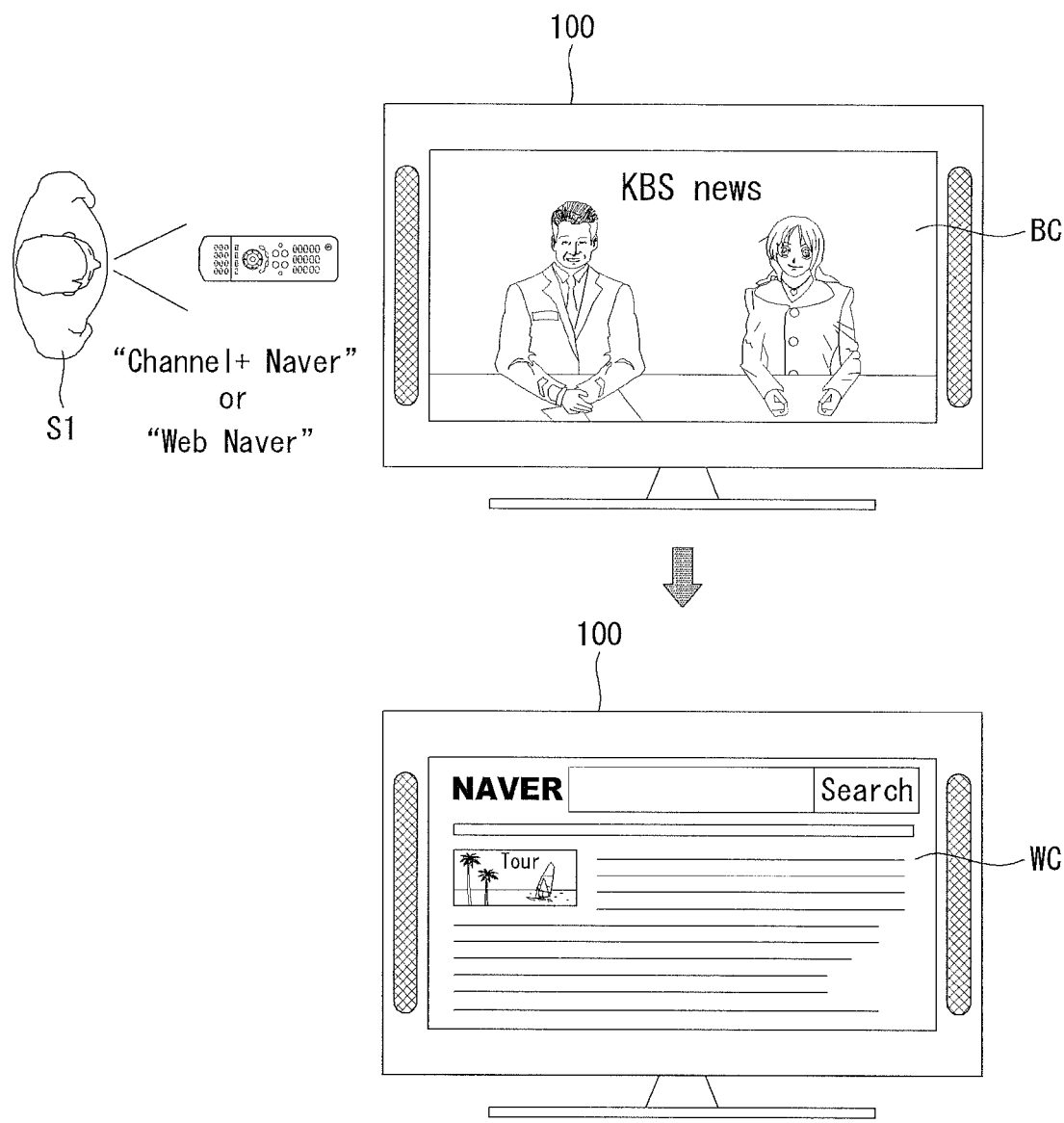

FIGS. 12 to 13 are flowcharts illustrating a process of a method for controlling an electronic device, respectively, according to an embodiment of the present invention. FIGS. 14 to 16 are views for explaining the embodiments illustrated in FIGS. 12 and 13 in detail.

With reference to FIG. 12, the controller may receive a voice command.

While certain content is being provided through the display unit 151, a voice command may be received from the user in operation S210 and the controller 180 may perform voice recognition on the received voice in operation S220.

The controller 180 may extract a search keyword from the voice command based on the voice recognition results. The controller 180 may determine whether or not the extracted search keyword includes channel information in operation S230.

Here, the channel information may include a control target, e.g., a channel name (e.g., MBC, KBS, SBS, etc.), a channel number (e.g., CH9, CH10, CH11, etc.), or the like, provided through the conventional remote controller.

Thus, when the voice command input by the user includes the foregoing channel name or the channel number information, the controller 180 may change a current channel into a channel corresponding to the voice command and provide the same to the user in operation S240.

When the extracted search keyword does not include channel information according to the determination results (in operation S230: NO), as shown in FIG. 13, the controller 180 may search for content according to a certain reference.

The foregoing channel information may be channel information in a narrow sense, such as a channel name, a channel number, or the like. However, in the method for controlling an electronic device provided according to an embodiment of the present invention, the channel information does not mean merely channel information in the narrow sense.

With reference to FIG. 13, when the voice command input by the user does not include channel information (e.g., a channel name, a channel number, etc.) in a narrow sense, the controller 180 may determine whether or not there is an identical broadcast name in operation S231.

For example, when the voice command input by the user is "channel+Kang Ho-dong", the controller 180 may search for content corresponding to "Kang Ho-dong" from the EPG. The controller 180 determines that a channel name and a channel number corresponding to "Kang Ho-dong" do not exist, and determine whether or not a matched broadcast name exists in operation S231.

When a broadcast name corresponding to "Kang Ho-dong" is searched, the controller 180 may change the channel to a broadcast program corresponding to the pertinent broadcast name in operation S234.

When a broadcast name corresponding to "Kang Ho-dong" is not searched, the controller 180 may determine whether or not broadcast information corresponding to "Kang Ho-dong" exists in operation S232.

Here, broadcast information includes the channel information in the narrow sense, and may include a broadcast program name (e.g., "One night two days", "unlimited challenge", etc.), a broadcast time (e.g., 18:00~20:00, etc.), a person's name (e.g., an actor, a director, etc.), the genre of a broadcast program (e.g., news, documentary, entertainment, etc.), an application name, a Web page name (e.g., Daum, Haver, etc.), and the like.

Thus, when the foregoing channel information is included in the voice command input by the user, the controller 180 may change the broadcast channel to the voice-recognized channel based on the channel information in operation S240. Namely, when a person's name "Kang Ho-dong" is included in the voice command, although it does not exist in the channel name, the controller 180 may provide any one of broadcast programs in which "Kang Ho-dong" appears in operation S235. Or, the controller 180 may provide a program list including a plurality of broadcast programs in which "Kang Ho-dong" appears.

Meanwhile, when content corresponding to the channel information in the narrow sense and the broadcast information is not searched, the controller 180 may inform the user that content corresponding to the voice command does not exist in operation S233.

With reference to FIG. 14, when a voice command input by the user is "channel+Kang Ho-dong", although a channel directly corresponding to "Kang Ho-dong" exists in the EPG, the controller 180 may search for various broadcast information related to "Kang Ho-dong" through the EPG. For example, a program list 62 including broadcast programs "Knee guru(a1)", "One night two days(a2)", and "Stockings (a3)" in which "Kang Ho-dong" appears may be provided to the display unit 151 according to the search results.

Thereafter, when a user's voice (e.g., "One night two days") is input to select one of the program list, the controller 180 may provide a broadcast program corresponding to "One night two days" to the screen in response to the voice input.

Meanwhile, in FIG. 15, it is assumed that a voice input by the user is "channel+Picasa" or "Web+Picasa". In a situation in which currently broadcast content is news provided through the EPG, when the voice command "channel+Picasa" is input, the controller 180 may provide a "Picasa" Web page to the screen through the flowcharts of FIGS. 12 and 13.

Meanwhile, in FIG. 16, it is assumed that a voice input by the user is "channel+Naver" or "Web+Naver". In a situation in which currently broadcast content is provided through the EPG, when the voice command "channel+Picasa" is input, the controller 180 may provide a "Naver" Web page to the screen through the flowcharts of FIGS. 12 and 13.

Figure 17:
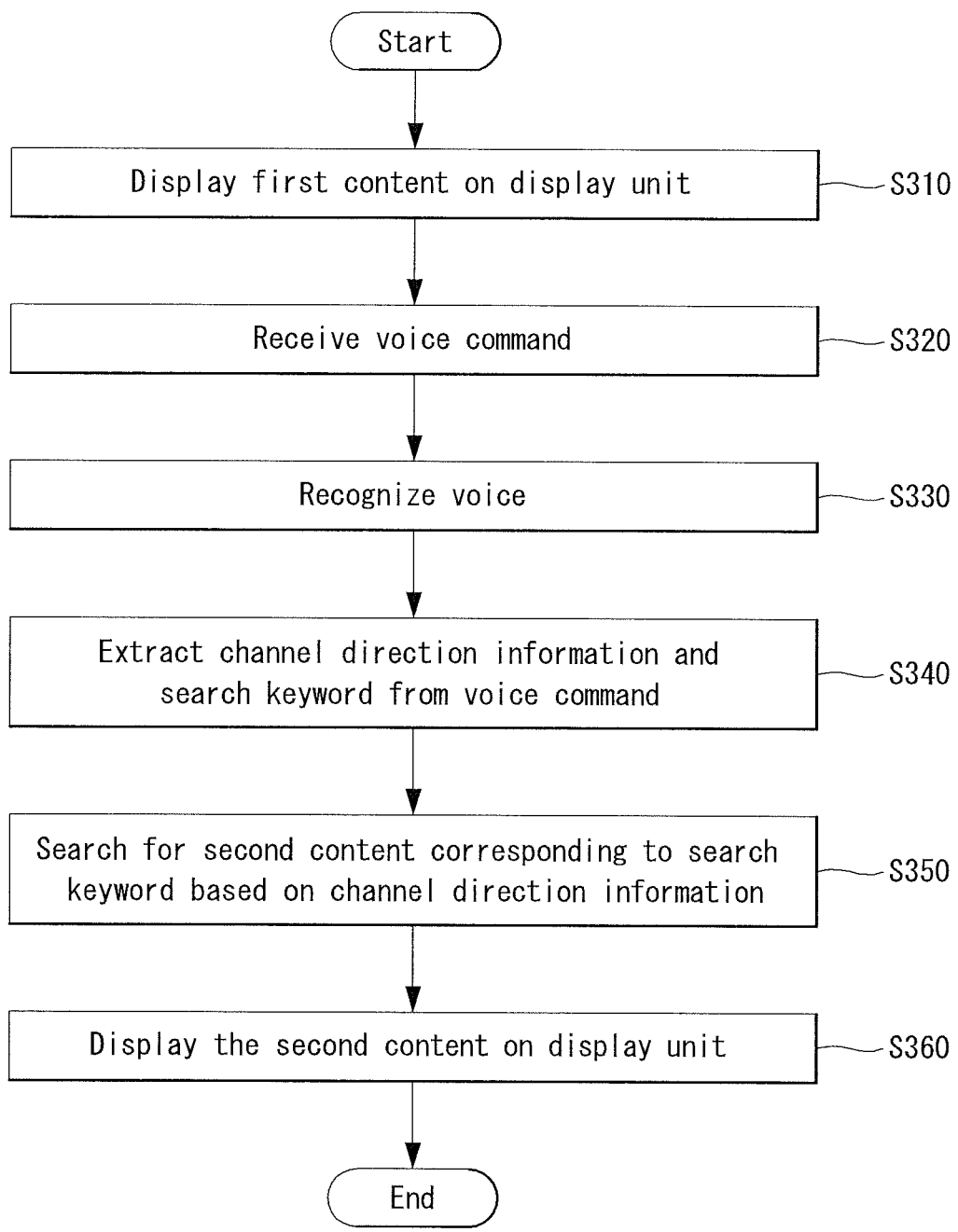
FIG. 17 is a flowchart illustrating a process of a method for controlling an electronic device according to an embodiment of the present invention.

FIG. 17 is a flowchart illustrating a process of a method for controlling an electronic device according to an embodiment of the present invention.

With reference to FIG. 17, first, the electronic device 100 may display first content on the display unit 151 in operation S310.

The first content may be a broadcast program provided through the EPG. Also, the content may be Web data provided through a Web. Also, the first content may be multimedia content previously stored in the memory 160 of the electronic device 100 or content provided through at least one of pre-set networks. The networks may include the foregoing DLNA network.

While the first content is being provided through the display unit 151, a voice command is received from the user in operation S320, and the controller 180 may perform a voice recognition on the received voice in operation S330.

The controller 180 may extract channel direction information and a search keyword from the voice command based on the voice recognition results in operation S340.

Thereafter, the controller 180 may search for second content corresponding to the search keyword based on the channel direction information in operation S350.

Also, the controller 180 may display the searched second content on the display unit 151 in operation S360.

Here, the channel direction information may include information related to order in which channels are changed in response to a user input for changing a channel. For example, when a currently provided channel is channel 8 based on the EPG and a voice command input by the user is "next channel", the controller 180 may change channel 8 into channel 8, a next channel of channel 8. Also, when a voice command input by the user is "previous channel", the controller 180 may change channel 8 into channel 7, a previous channel of channel 8.

Meanwhile, as described above, the channel direction information may be information directly related to a channel number, or may include information regarding broadcast information directly unrelated to a channel name or a channel number.

For example, when content currently provided through the electronic device 100 is "news" and a voice command input by the user is "next news", the channel direction information is "next" and a search keyword is "news". In this case, the controller 180 may recognize it as a command for providing a channel providing news among broadcast programs after the current channel among various news programs provided through the EPG. Thus, when the currently provided news is provided through channel 8 and another news is provided through channel 20 after channel 8, the controller 180 may change the channel from channel 8 to channel 20 and provide the same according to the voice command "next news".

Meanwhile, a detailed embodiment of controlling an electronic device based on channel direction information will be described with reference to FIG. 18.

Figure 18:
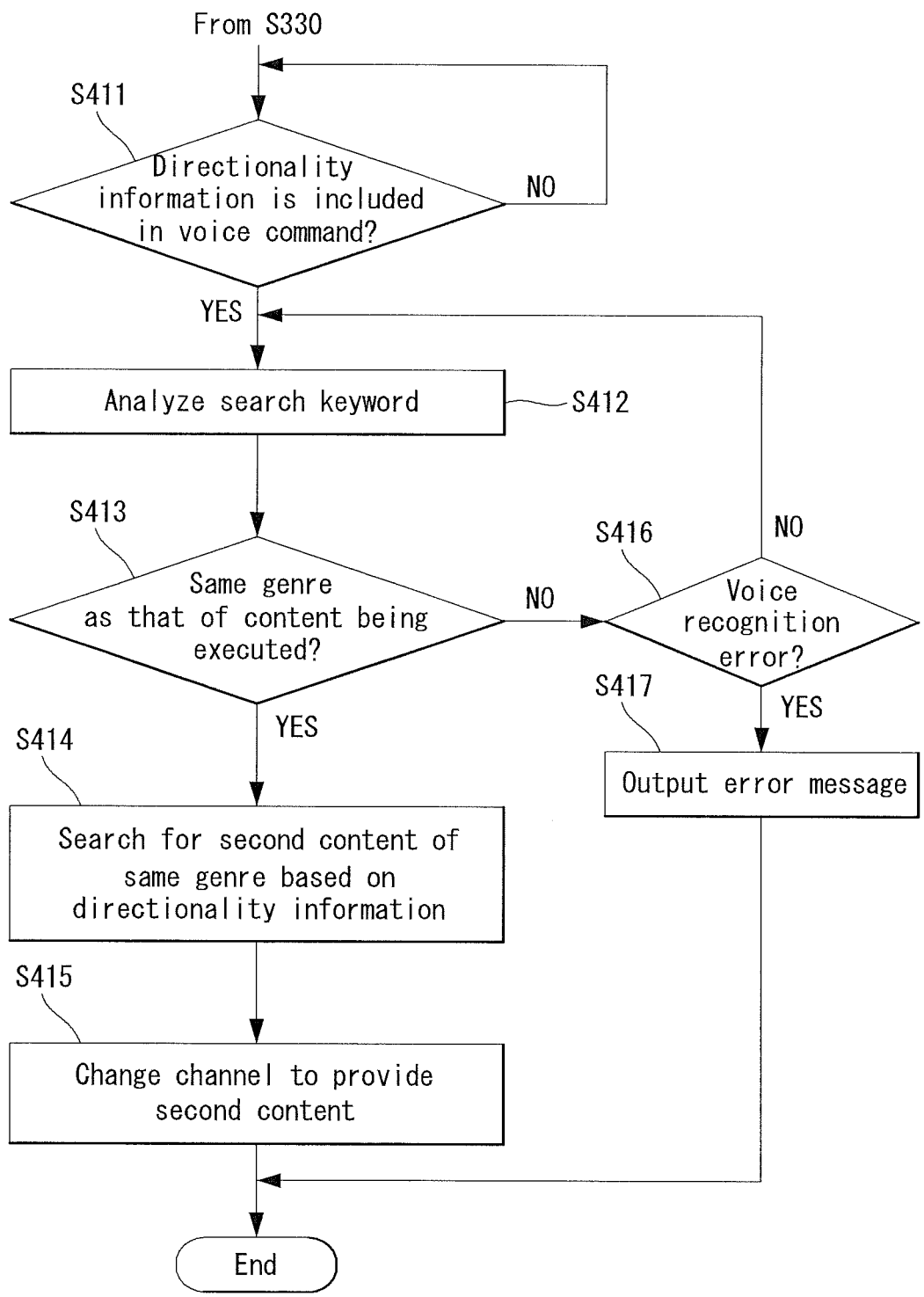
FIG. 18 is a flowchart illustrating a method for controlling an electronic device to change a channel based on channel direction information in the embodiment illustrated in FIG. 17.

FIG. 18 is a flowchart illustrating a method for controlling an electronic device to change a channel based on channel direction information in the embodiment illustrated in FIG. 17.

With reference to FIG. 18, the controller 180 performs voice recognition on the received voice in operation S330, and the controller 180 may determine whether directionality information is included in the voice command according to the voice recognition results in operation S411.

When the voice command includes channel direction information, the controller 180 may search for a search keyword extracted according to the voice recognition results, based on the channel direction information, and provide the search results to the user.

In this case, although the channel direction information is extracted, the controller 180 first analyzes the search keyword in operation S412. Namely, a voice command input by the user may be configured in the form of "channel direction information+genre", and in order to control a channel through a voice command including channel direction information, information regarding genre is required to be the same.

For example, when a voice command input by the user is "Daum Web page" and content provided through a current channel is a broadcast program, the controller 180 may provide a recommendation message for inputting voice again, while providing a voice command error message.

Thus, the controller 180 may determine whether or not the current is the same as the currently executed content in operation S413 according to the search keyword analysis results in operation S412.

When the search keyword included in the voice command is the same as the currently executed content according to the determination results, the controller 180 may search for second content of the same genre based on the directionality information in operation S414.

Also, the controller 180 may provide the second content by changing the channel according to the search results in operation S415.

When the genre of the search keyword included in the voice command is not the same as the genre of the currently executed content, the controller 180 may determine whether or not there is a voice recognition error in operation S416.

When there is a voice recognition error, the controller 180 may output an error message indicating that an error has occurred in the voice recognition process in operation S417.

When there is no voice recognition error, the controller 180 may repeatedly perform steps S412 and S413 with respect to a voice command input afterwards.

Figure 19:
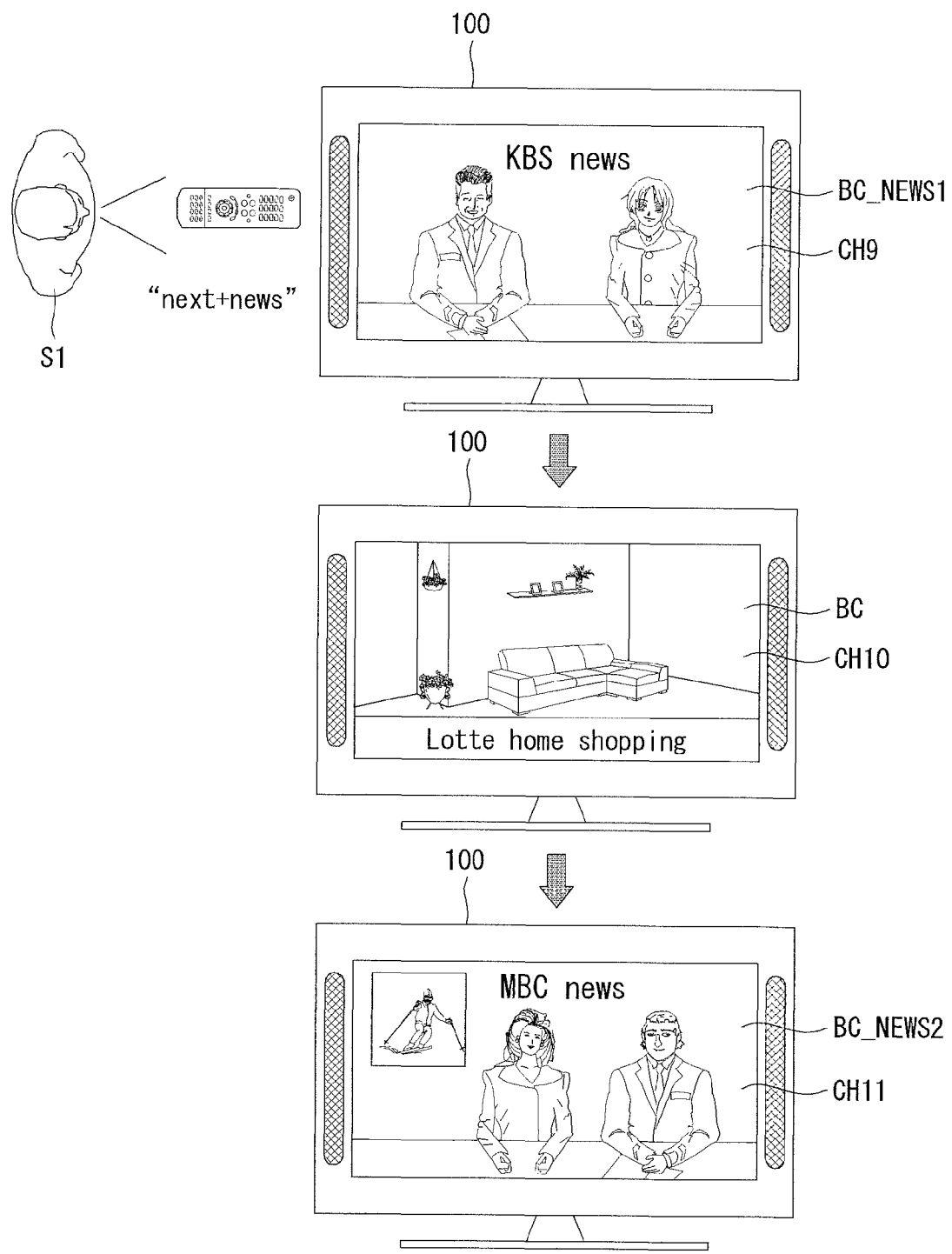
FIGS. 19 and 20 are views for explaining the embodiments illustrated in FIGS. 17 and 18 in detail.
Figure 20:
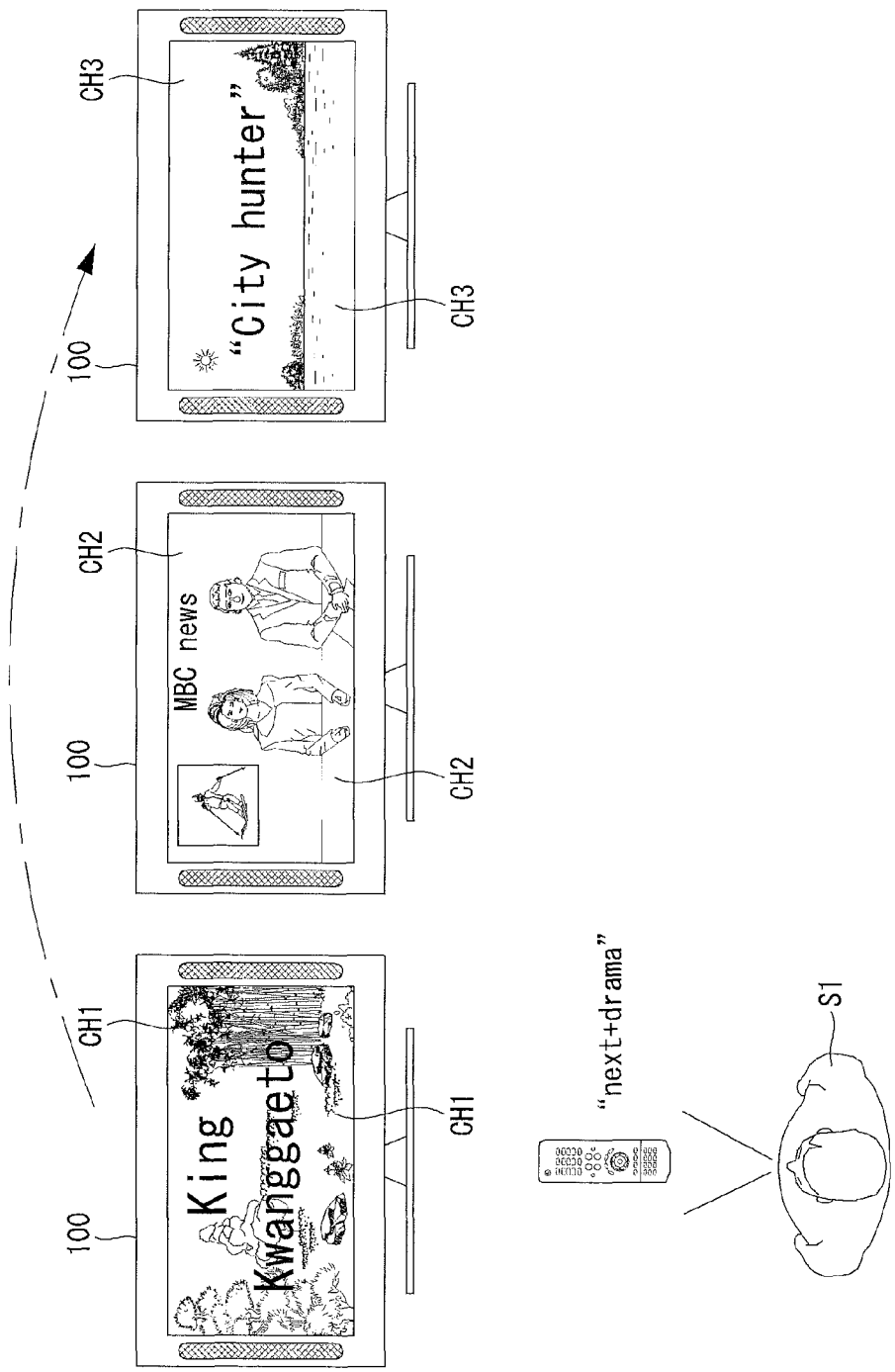

FIGS. 19 and 20 are views for explaining the embodiments illustrated in FIGS. 17 and 18 in detail.

With reference to FIG. 19, it is assumed that content provided to the user is first news (BC_NEWS1) broadcast on channel 8 and a voice command input by the user is "next+news". And, channel 10 (BC) is a home shopping broadcast and channel 11 is second news (BC_NEWS2) whose broadcaster is different from that of first news and which has the same genre.

In this case, when a user's voice command is "next channel", the controller 180 may change channel 9 to channel 10. However, when the user's voice command is "next news", the controller 180 may change current channel 9 to channel to provide a news program of the same genre as the previous genre to the user.

With reference to FIG. 20, it is assumed that content provided to the user is a first drama broadcast on channel 1 and a voice command input by the user is "next+drama". And, channel 2 may be news, and channel 3 may be a second drama whose broadcaster is different from that of the first drama and which has the same genre as that of the first drama.

Similarly, when a voice command provided by the user is "next channel", the currently provided first drama may be changed to a news program of channel 2. However, when the voice command is "next+drama", channel information broadcasting drama among channels after the first drama is searched to change the channel.

Meanwhile, the foregoing channel direction information is not limited to the information related to order in which channels are changed in response to a channel change input. For example, it is assumed that the electronic device 100 is connected to a plurality of external devices through a certain network.

When a voice command input by the user is "next+content" with respect to content currently provided through the electronic device 100, the controller 180 may recognize "next" as information regarding an external device connected with the electronic device 100 through a network.

Namely, when there are a first external device, a second external device, . . . , Nth external device which are sequentially connected with the electronic device 100 through a network, "next+content" may refer to content provided by the first external device which first forms a network with the electronic device 100.

The method for controlling of the electronic device according to embodiments of the present invention may be recorded in a computer-readable recording medium as a program to be executed in the computer and provided. Further, the method for controlling a display device and the method for displaying an image of a display device according to embodiments of the present invention may be executed by software. When executed by software, the elements of the embodiments of the present invention are code segments executing a required operation. The program or the code segments may be stored in a processor-readable medium or may be transmitted by a data signal coupled with a carrier in a transmission medium or a communication network.

The computer-readable recording medium includes any kind of recording device storing data that can be read by a computer system. The computer-readable recording device includes a ROM, a RAM, a CD-ROM, a DVD±ROM, a DVD-RAM, a magnetic tape, a floppy disk, a hard disk, an optical data storage device, and the like. Also, codes which are distributed in computer devices connected by a network and can be read by a computer in a distributed manner are stored and executed in the computer-readable recording medium.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. An electronic device comprising:
   a display;
   a microphone;
   a broadcast receiving module receiving broadcast signals or broadcast associated information from an external broadcast management server via a broadcast channel; and
   a controller configured to:
      display a first content on the display, the first content being a broadcast program received through the broadcast receiving module,
      receive a first voice command from a user through the microphone while the first content is displayed, wherein the first voice command is a single voice command including (i) a first part defining a first search source of an Internet-based search engine and (ii) a second part defining a first search keyword, wherein the first part is followed by the second part, and;
      determine whether the first search source is distinguished from the first search keyword in the first voice command, wherein the first search source is specified after receiving the first voice command based on the first search source being distinguished from the first search keyword, and wherein the first search source and the first search keyword are extracted from the first voice command,
      cause a communication unit to access to a first web site corresponding to the first search source after receiving the first voice command, and
      cause the display to display a first web page including a searched content corresponding to the first search keyword,
   wherein the searched content is searched from the first search source,
   wherein the displayed first web page includes a search window with the first search keyword being displayed in the search window, and
   wherein the controller is further configured to,
      receive a second voice command through the microphone while the first web page is displayed, wherein the second voice command is a single voice command including (i) a third part defining a second search source of an Internet-based search engine and (ii) a fourth part defining a second search keyword, wherein the third part is followed by the fourth part, and wherein the second search source is different from the first search source,
      based on the second voice command including the second search source and the second search keyword being received while the first web page is displayed:
         cause the communication unit to access a second web site corresponding to the second search source, and
         cause the display to display a second web page including a second content corresponding to the second search keyword, wherein the second web page is different from the first web page, and wherein the searched content is searched from the second search source.

2. The electronic device of claim 1, wherein the controller is configured to search for content corresponding to the first search keyword from an electronic program guide (EPG), or the memory, match the first search source and at least one content searched from the first search source, and display the matched result on the display.

3. The electronic device of claim 1, wherein the first search keyword includes at least one of a channel name, a channel number, a broadcast program name, a broadcast time, a person's name, a genre of a broadcast program, an application name, or a Web page name.

4. The electronic device of claim 1, wherein the controller is configured to, based on a plurality of contents being searched in the first search source, control the display to display a list comprising the plurality of searched contents.

5. A method for controlling an electronic device, comprising:
   displaying a first content on the display, the first content being a broadcast program received through a broadcast receiving module;
   receiving, via a microphone, a first voice command from a user while the first content is displayed, wherein the first voice command is a single voice command including (i) a first part defining a first search source of an Internet-based search engine and (ii) a second part defining a first search keyword, wherein the first part is followed by the second part, and
   determining whether the first search source is distinguished from the first search keyword in the first voice command, wherein the first search source is specified after receiving the first voice command based on the first search source being distinguished from the first search keyword, and wherein the first search source and the first search keyword are extracted from the first voice command;
   accessing, via a communication unit, a first web site corresponding to the first search source after receiving the first voice command;
   displaying a first web page corresponding to the first web site on a display, the first web page including a searched content corresponding to the first search keyword;
   receiving, via the microphone, a second voice command while the first web page is displayed, wherein the second voice command is a single voice command including (i) a third part defining a second search source of an Internet-based search engine and (ii) a fourth part defining a second search keyword, wherein the third part is followed by the fourth part, and wherein the second search source is different from the first search source;
   based on the second voice command including the second search source and the second search keyword being received while the first web page is displayed,
   accessing, via the communication unit, a second web site corresponding to the second search source; and
   displaying a second web page including a second content corresponding to the second search keyword, wherein the second web page is different from the first web page, and wherein the second content is searched from the second search source.

6. The method of claim 5, further comprising:
searching for content corresponding to the first search keyword from an EPG, the memory, or the external device connected with the electronic device through the network,
matching the first search source and at least one content searched from the first search source, and
displaying the matched result on the display.

7. The method of claim 5, wherein the first search keyword includes at least one of a channel name, a channel number, a broadcast program name, a broadcast time, a person's name, a genre of a broadcast program, an application name, or a Web page name.

8. The method of claim 5, further comprising:
displaying a list comprising a plurality of searched contents on the display based on a plurality of contents being searched in the first search source included in the first voice command.

9. The electronic device of claim 1, wherein the controller is further configured to:
determine whether the first voice command includes all of the first search source and the first search keyword, and
based on a determination that the first voice command includes only the first search keyword without the first search source, search content corresponding to the first search keyword in an internal memory of the electronic device.

10. The electronic device of claim 1, wherein the controller is further configured to receive the first voice command through a microphone provided in a remote controller which controls an operation of the electronic device through the communication unit.

11. The electronic device of claim 1, wherein the controller is further configured to:
execute a voice recognition application to enter a voice recognition mode;
cause the display to display an indicator inducing the user to provide the first voice command, the indicator comprising a graphic object and text.

12. The electronic device of claim 1, wherein the controller is further configured to control the communication unit to receive a searched result from an external server and cause the display to display the received searched result.

13. The electronic device of claim 1, wherein the first search source comprises an external device connected with the electronic device through a network.

14. The electronic device of claim 1,
wherein the first voice command comprises various types of natural language, and
wherein the first search keyword is extracted from the various types of natural language based on Natural Language Processing (NLP).

\* \* \* \* \*